(12) United States Patent
Nagano et al.

(10) Patent No.: US 8,174,582 B2
(45) Date of Patent: May 8, 2012

(54) DRIVE DEVICE AND IMAGE PICKUP APPARATUS

(75) Inventors: Kouta Nagano, Osaka (JP); Syuuichi Sato, Osaka (JP)

(73) Assignee: Sony Corporation (JP)

( * ) Notice: Subject to any disclaimer, the term of this patent is extended or adjusted under 35 U.S.C. 154(b) by 183 days.

(21) Appl. No.: 12/660,090

(22) Filed: Feb. 19, 2010

(65) Prior Publication Data

US 2010/0220206 A1 Sep. 2, 2010

(30) Foreign Application Priority Data

Mar. 2, 2009 (JP) ................. P2009-048044

(51) Int. Cl.
*H04N 5/228* (2006.01)
*G03B 17/00* (2006.01)
(52) U.S. Cl. ...................... 348/208.1; 396/52
(58) Field of Classification Search .. 348/208.1–208.11, 348/208.99, 222.1; 396/52, 53, 75, 133
See application file for complete search history.

(56) References Cited

U.S. PATENT DOCUMENTS

| | | | | |
|---|---|---|---|---|
| 6,236,430 B1 * | 5/2001 | Suzuki et al. | ............... | 348/219.1 |
| 7,057,645 B1 * | 6/2006 | Hara et al. | ................. | 348/208.6 |
| 7,576,778 B2 * | 8/2009 | Hirota et al. | ............... | 348/208.5 |
| 7,639,933 B2 * | 12/2009 | Seo et al. | ........................ | 396/55 |
| 7,639,934 B2 * | 12/2009 | Ziemkowski et al. | .......... | 396/55 |
| 2009/0160951 A1 * | 6/2009 | Anderson et al. | .......... | 348/208.4 |

FOREIGN PATENT DOCUMENTS

JP 2006-259114 A 9/2006

* cited by examiner

*Primary Examiner* — Trung Diep
(74) *Attorney, Agent, or Firm* — Lerner, David, Littenberg, Krumholz & Mentlik, LLP

(57) ABSTRACT

Disclosed herein is a drive device including an imaging element creating a image signal relating to an object image, a securing body, a displacement body capable of displacement in a predetermined direction in a predetermined plane having a light-receiving surface of the imaging element with respect to the securing body with the imaging element mounted to the displacement body, and a first guide mechanism and a second guide mechanism adapted each to guide displacement of the displacement body in the predetermined direction. The second guide mechanism includes a guide device, and a guided device. The guide device is configured to be positionally changeable in a plane parallel to the predetermined plane. The displacement body is turnably displaced with the first guide mechanism serving as a fulcrum when the guided device is displaced in response to the positional change of the guide device.

6 Claims, 18 Drawing Sheets

DRIVE DEVICE AND IMAGE PICKUP APPARATUS

CROSS-REFERENCE TO RELATED APPLICATION

The present application claims priority from Japanese Patent Application No. JP JP 2009-048044 filed in the Japanese Patent Office on March 2, 2009, the entire content of which is incorporated herein by reference.

BACKGROUND OF THE INVENTION

1. Field of the Invention

The present invention relates to a drive device and an image pickup apparatus equipped with the drive device.

2. Description of the Related Art

Some image pickup apparatuses having an imaging element such as a CCD or the like are equipped with an image stabilizer unit which shifts the position of the imaging element in response to hand movement in order to correct the hand movement at the time of shooting. (See e.g. Japanese Patent Laid-Open No. 2006-259114.)

The image stabilizer unit operates as a drive device such that in general a piezoelectric actuator disposed on a lateral side portion generates a drive force to shift the imaging element in a plane vertical to an optical axis.

Specifically, the image stabilizer unit includes a piezoelectric actuator having a piezoelectric element expanding and contracting in response to applied electric voltage and a drive shaft extending from the piezoelectric element; a securing member provided with the piezoelectric actuator; and a displacement body (also called "the slider") provided with an imaging element. In addition, the image stabilizer unit is configured to have a mechanism in which a bearing portion installed on the slider is friction-joined to a drive shaft of the piezoelectric actuator in the securing member. In the image stabilizer unit having such a mechanism, the slider is driven by use of the principle as below. If the drive shaft is displaced relatively moderately, the slider is displaced through the friction-joint force while simultaneously following the drive shaft. If the drive shaft is displaced relatively rapidly, the slider is not displaced because of slippage occurring at the friction-joint portion.

SUMMARY OF THE INVENTION

However, the image stabilizer unit having the above-described configuration is composed of a large number of members. Therefore, in the built-up state (the assembled state), the imaging element adapted to receive object light may tilt in a plane including the light-receiving surface of the imaging element in some cases.

The tilt of the imaging element described above occurs because the displacement body attached with the imaging element is tilted in the plane including the light-receiving surface of the imaging element due to the error of the image stabilizer unit in the built-up state. If the image stabilizer unit provided with the tilted imaging element is mounted to the image pickup apparatus as it is, then the image pickup apparatus provides a tilted image not intended by the user.

Accordingly, it is desirable to provide a technology capable of correcting the tilt of an imaging element in a drive device for driving a displacement body mounted with the imaging element.

According to an embodiment of the present invention, there is a drive device including: an imaging element creating a image signal relating to an object image; a securing body; a displacement body capable of displacement in a predetermined direction in a predetermined plane having a light-receiving surface of the imaging element with respect to the securing body with the imaging element mounted to the displacement body; and a first guide mechanism and a second guide mechanism adapted each to guide displacement of the displacement body in a predetermined direction. The second guide mechanism includes guide means mounted to the securing body and guided means mounted to the displacement body and guided by the guide means. The guide means is configured to be positionally changeable in a plane parallel to the predetermined plane, and the displacement body is turnably displaced with the first guide mechanism serving as a fulcrum when the guided means is displaced in response to the positional change of the guide means.

According to the embodiment of the invention, since the displacement body provided with the imaging element can be turnably displaced, the tilt of the imaging element can be corrected.

DETAILED DESCRIPTION OF THE PREFERRED EMBODIMENTS

Preferred embodiments of the present invention will hereinafter be described with reference to the drawings.
<Embodiments>
[External Configuration of an Image Pickup Apparatus]

Figure 1:
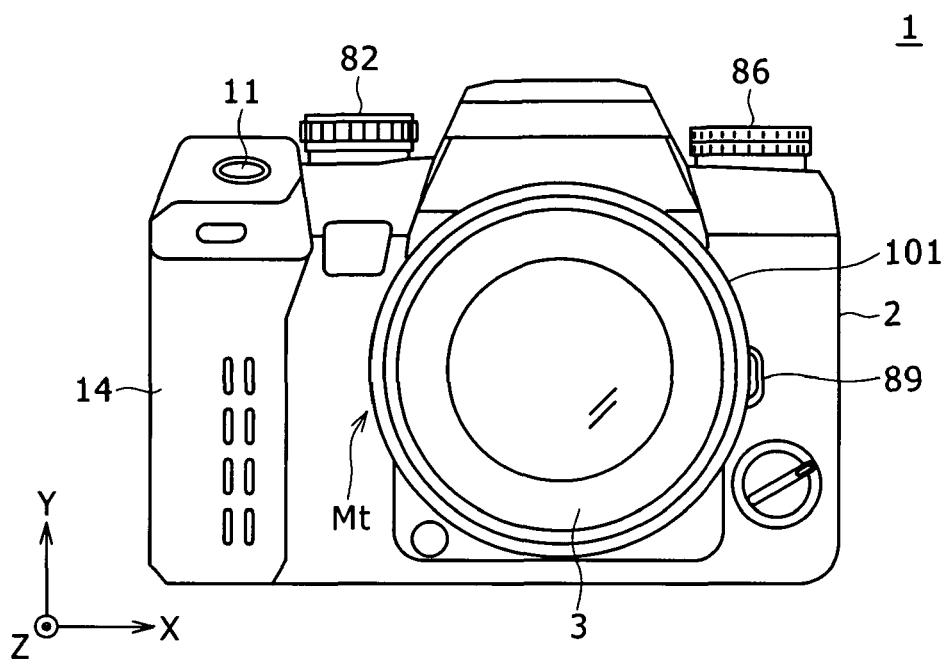
FIG. 1 illustrates an external configuration of an image pickup apparatus according to an embodiment of the present invention.
Figure 2:
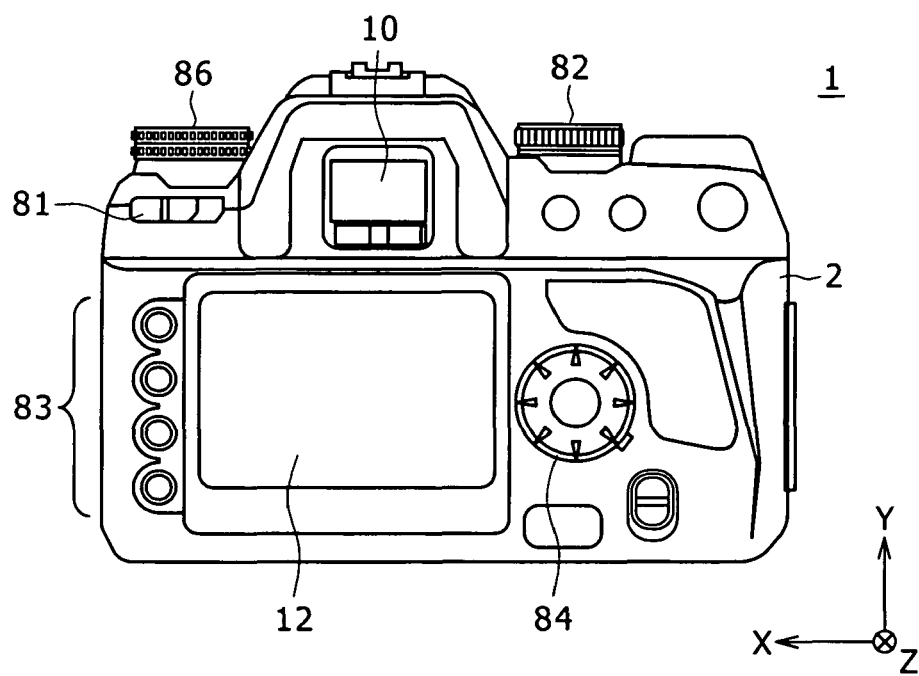
FIG. 2 illustrates an external configuration of the image pickup apparatus according to the embodiment of the present invention.

FIGS. 1 and 2 illustrate an external configuration of an image pickup apparatus 1 according to an embodiment of the present invention. FIG. 1 is an external front view of the image pickup apparatus 1 and FIG. 2 is an external rear view of the image pickup apparatus 1. The image pickup apparatus 1 is configured as a single-lens reflex camera with interchangeable lenses.

Referring to FIG. 1, the image pickup apparatus 1 includes a camera main body (camera body) 2, to which an interchangeable imaging lens unit (interchangeable lens) 3 is removably attached.

The imaging lens unit 3 mainly includes a lens barrel 101, a lens group 37 installed inside the lens barrel 101 (FIG. 3), and a diaphragm not shown. The lens group 37 includes a focus lens which is displaced in an optical-axial direction to change a focal position.

The camera main body 2 is provided at the general front center with an annular mount portion Mt adapted to receive the imaging lens unit 3 mounted thereto. In addition, the camera main body 2 is provided in proximity to the annular mount portion Mt with a mount/dismount button 89 used to mount/dismount the imaging lens unit 3.

The camera main body 2 is provided with a mode setting dial 82 at its front upper-left portion and with a control value setting dial 86 at its front upper-right portion. The operation of the mode setting dial 82 can perform the setting operation (switching operation) for various modes of the camera. The various modes include various imaging modes (person photographing mode, landscape photographing mode, continuous photographing mode, etc.), a reproduction mode in which an image picked up is reproduced, a communication mode in which data communication is performed between the camera main body 2 and an external device. The operation of the control value setting dial 86 can set a control value in each of the various photographing modes.

The camera main body 2 is provided at a front left end portion with a grip portion 14 to be gripped by a photographer. A release button 11 for indicating exposure start is provided in the upper surface of the grip portion 14. The grip portion 14 is internally provided with a battery housing chamber and a card housing chamber. The battery housing chamber houses e.g. four size AA batteries as the electric source of the camera. The card housing chamber removably houses a memory card used to record the image data of images.

The release button 11 is a two-step detection button capable of detecting two states, a half-press state (S1-state) and a full-press state (S2-state). If the release button 11 is half-pressed and brought into the S1-state, preparing operation (e.g. AF control operation, AE control operation and the like) for taking a recording still picture (actual image) pertaining to an object is performed. If the release button 11 is further depressed and brought into the S2-state, the imaging operation for the actual image is performed as a series of operations. Specifically, an imaging element 15 is used to perform exposure operation for an object image and image signals obtained by the exposure operation are subjected to predetermined image processing.

In FIG. 2, the camera main body 2 is provided with a rear monitor 12 at the general center of the rear surface. The rear monitor 12 is configured as e.g. a color liquid crystal display (LCD). The rear monitor 12 can display a menu screen for setting shooting conditions and reproduce and display an image recorded in the memory card in the reproduction mode.

The camera main body 2 is provided with a viewfinder at the general upper center of the rear surface. The viewfinder 10 receives an object image led from the imaging lens unit 3. By looking into the viewfinder 10 the photographer can visibly recognize an image equivalent to the object image obtained by the imaging element 15.

Specifically, the object image incident on the imaging optical system is reflected upward by a mirror mechanism 103 (FIG. 3) and is visibly recognized through object lenses 106. In this way, the photographer can perform framing by looking into the viewfinder 10. Incidentally, at the time of shooting the actual image, the mirror mechanism 103 retreats from an optical path of light forming the object image. The light (light forming the object image) from the imaging lens unit 3 reaches the imaging element 15, which can provide an image (image date) pertaining to the object.

A main switch 81 is installed at an upper left portion of the rear monitor 12. The main switch 81 is composed of a two-point slide switch. If its contact is set at a left "OFF" position, a power source is turned off. If the contact is set at a right "ON" position, the power source is turned on.

A direction selection key 84 is installed on the right of the rear monitor 12. This direction selection key 84 has a circular operation button. This circular operation button is designed to detect the pressing operation of four directions; up, down, left and right, and of the other four directions; upper right, upper left, lower right and lower left. In addition, direction selection key 84 can detect the pressing operation of a central pushing button as well as the pressing operation of the eight directions mentioned above.

A setting button group 83 composed of a plurality of buttons for setting a menu screen, deleting an image and so on is installed on the left side of the rear monitor 12.

Figure 3:
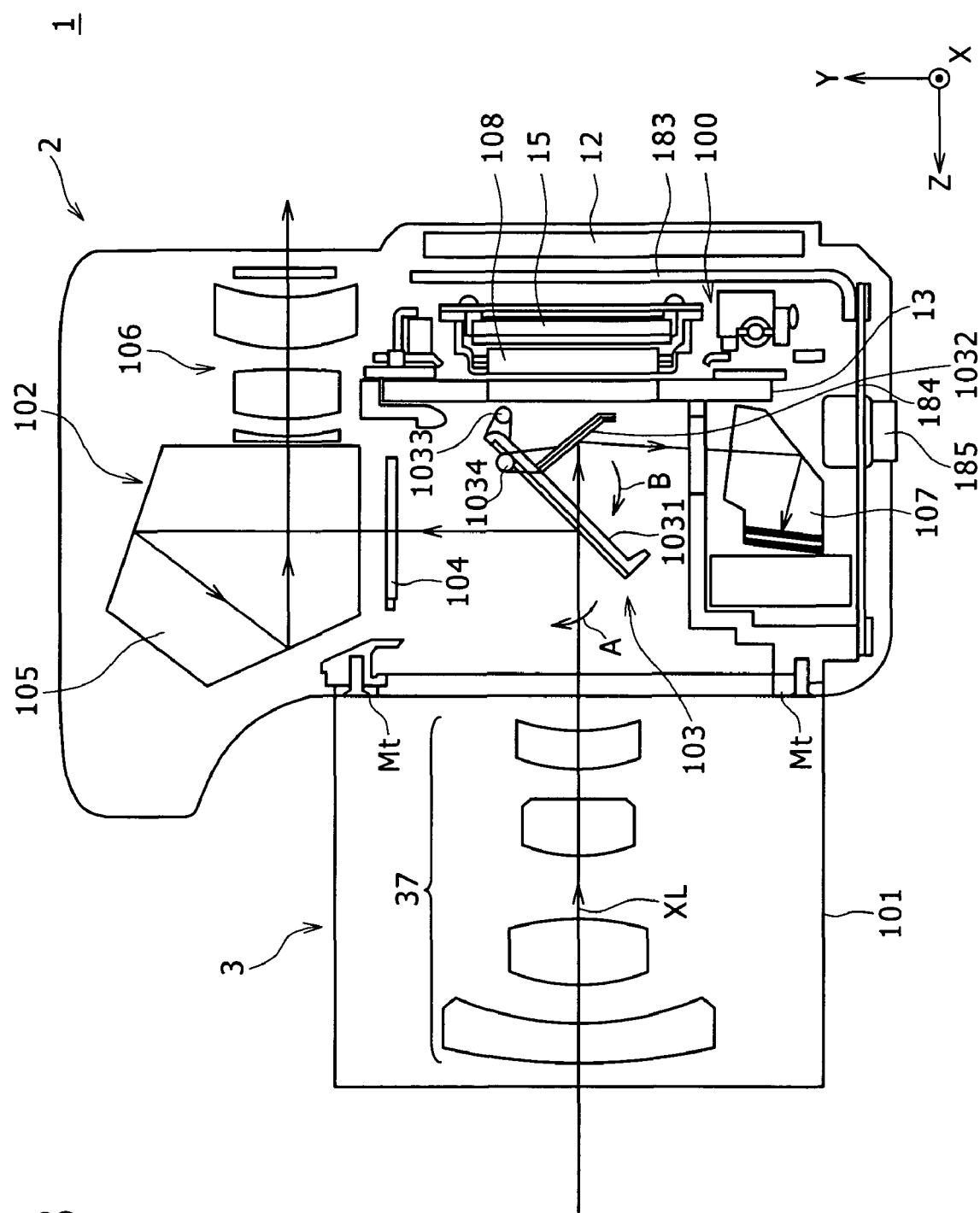
FIG. 3 illustrates a longitudinal cross-sectional view of the image pickup apparatus.
Figure 4:
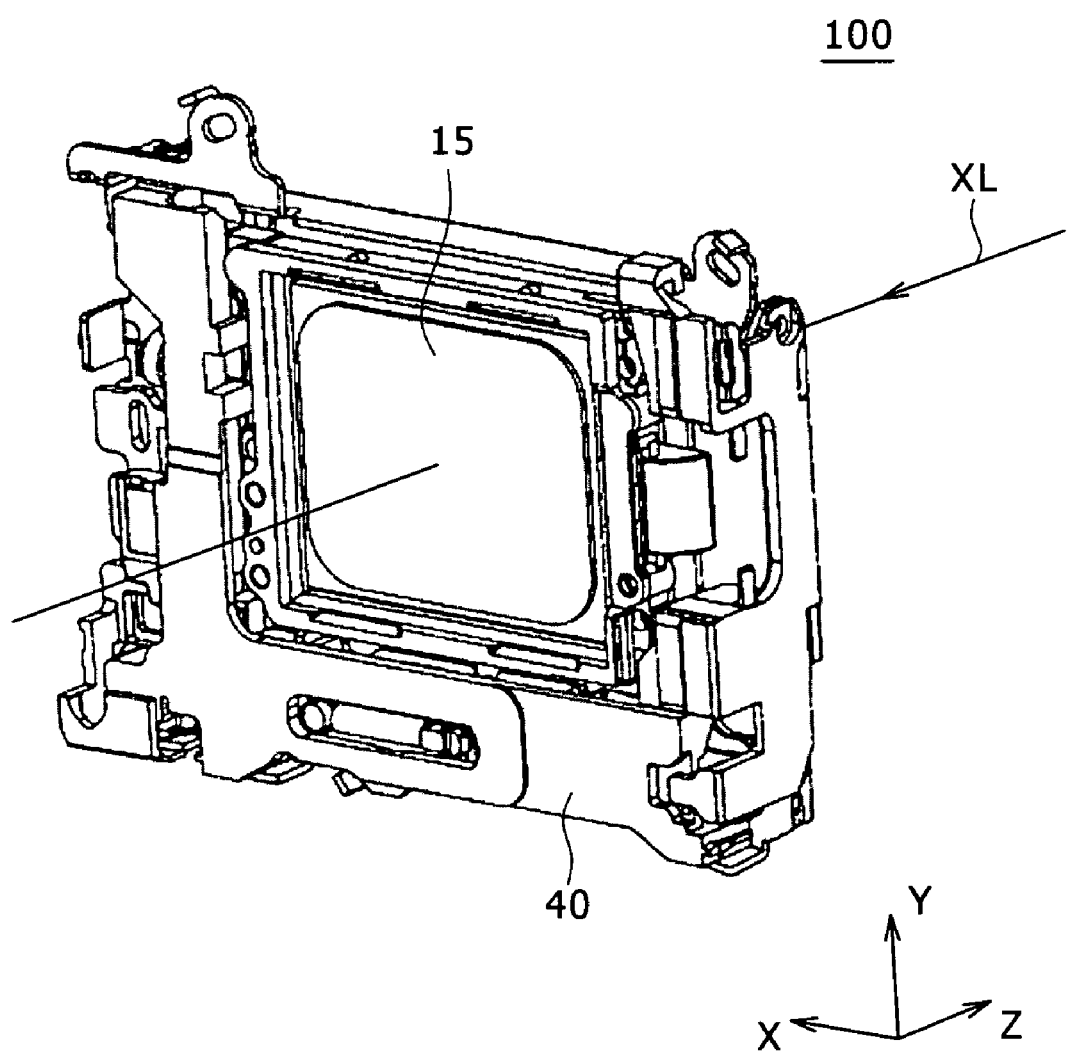
FIG. 4 is an external perspective view of an image stabilizer unit according to an embodiment of the present invention.

A description is given of an internal configuration of the image pickup apparatus 1. FIG. 3 is a longitudinal cross-sectional view of the image pickup apparatus 1. FIG. 4 is an external perspective view of an image stabilizer unit 100. It is to be noted that a light-receiving surface of the imaging element 15 exists on a +Z-side in FIG. 4.

Referring to FIG. 3, the image pickup apparatus 1 internally includes the imaging element 15, a viewfinder portion 102 (viewfinder optical system), the mirror mechanism 103, a focal point detection portion 107, an image stabilizer unit (drive unit) 100 and a shutter unit 13.

The imaging element (imaging sensor) 15 is disposed in a plane vertical to an optical axis XL of the lens group 37 of the imaging lens unit 3 mounted to the image pickup apparatus 1 and generates image signals pertaining to an object image. Details are described later.

The mirror mechanism 103 (a reflecting plate) is disposed on the above-mentioned optical axis XL at a position where object light is reflected toward the viewfinder portion 102. The object light having passed through the imaging lens unit 3 is reflected upward by the mirror mechanism 103 (a main mirror 1031 described later) and is focused onto a focal plate 104 (a focusing screen). The object light having passed through the imaging lens unit 3 partially passes through the mirror mechanism 103.

The viewfinder portion 102 includes a pentaprism 105, the eye lenses 106 and the viewfinder 10. The pentaprism 105 is a prism having a pentagon in cross-section and adapted to reflect therein an object image incident from its lower surface to reverse it from top to bottom and from left to right, providing an erected image. The eye lenses 106 lead the object image brought into the erected image by the pentaprism 105, to the outside of the viewfinder 10. With such a configuration, the viewfinder portion 102 functions an optical finder for recognizing an object field at the time of waiting for shooting.

The mirror mechanism 103 is composed of a main mirror 1031 and a sub mirror 1032. The sub mirror 1032 is turnably provided on the back surface of the main mirror 1031 so as to fall toward the back surface of the main mirror 1031. The object light passing through the main mirror 1031 is partially reflected by the sub mirror 1032 and this reflected object light is directed to the focal point detection portion 107.

The above-mentioned mirror mechanism 103 is configured as the so-called quick return mirror. At the time of exposure, the mirror mechanism 103 jumps toward the upside indicated with arrow A with a pivot shaft 1033 serving as a pivotal fulcrum and stops at a position below a focal point plate 104. In this case, the sub mirror 1032 turns toward the back surface of the main mirror 1031 in a direction indicated with arrow B with a pivot shaft 1034 serving as a fulcrum. When the mirror mechanism 103 stops at a position below the focal point plate 104, the sub mirror 1032 is folded generally parallel to the main mirror 1031. With this, the object light from the imaging lens unit 3 reaches and exposes the imaging element 15 without being interrupted by the mirror mechanism 103. After the exposure, the mirror mechanism 103 returns to an original position (indicated in FIG. 3).

The focal point detection portion 107 is configured as the so-called AF sensor composed of a ranging element for detecting the focal information of an object, and the like. The focal point detecting portion 107 is disposed below the mirror mechanism 103 and detects a focal position by e.g. the known phase difference detection method.

As illustrated in FIG. 4, the imaging element 15, along with a first slider 40 and a piezoelectric actuator as a drive portion both described later, constitutes an image stabilizer unit 100 for correcting shake such as hand movement. The image stabilizer unit 100 has a function of driving the piezoelectric actuator on the basis of information on the shake of the image pickup element 1 detected by a gyro unit (not illustrated) in the image pickup device 1 and displacing the imaging element 15 in an up-down (Y-axis) direction and in a left-right (X-axis) direction. Incidentally, the details of structure and operation of the image stabilizer unit 100 will be described later.

A low-pass filter 108 is disposed in front of the imaging element 15 on the object field side to prevent the incidence of infrared light and the occurrence of a quasi-color and of color moire. Further, a shutter unit 13 is disposed in front of the low-pass filter 108. This shutter unit 13 is a mechanical focal plane shutter having a curtain moving in the up-down direction to open and close the optical path of the object light led to the imaging element 15 along the optical axis XL.

The above-mentioned component parts of the image pickup apparatus 1 are connected (secured) to one another by chassis made of a metal material such as e.g. iron. The above-mentioned chassis in the present embodiment are composed of a front chassis not shown, a rear chassis 183 and a bottom chassis 184 by way of example. These chassis play a role of a support member supporting the component parts in the image pickup apparatus 1 described above. Incidentally, the bottom chassis 184 is provided with a tripod attachment portion 185.

[Configuration of Image Stabilizer Unit]

Figure 5:
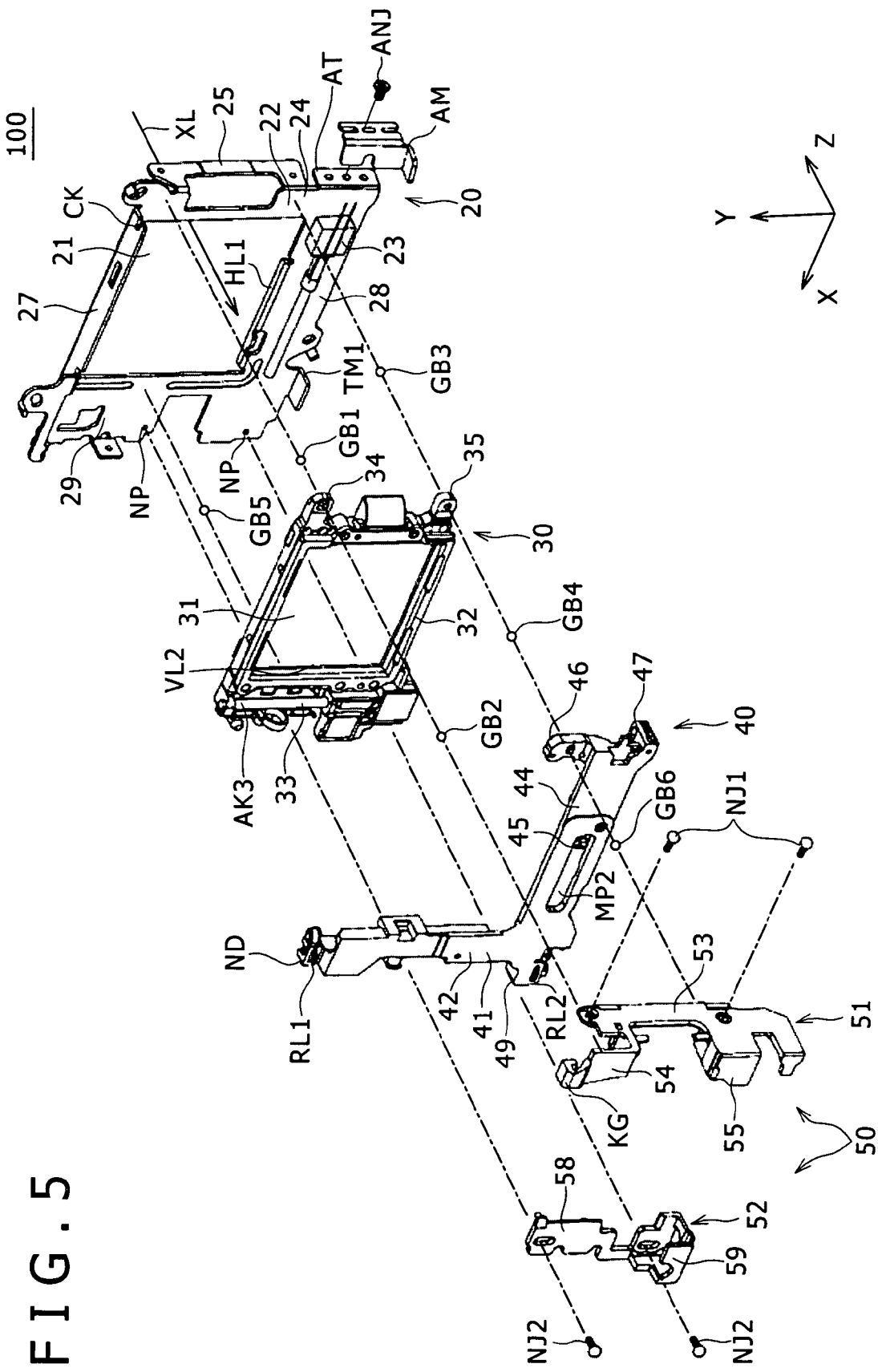
FIG. 5 is a schematic exploded perspective view illustrating a configuration of the image pickup apparatus.
Figure 6:
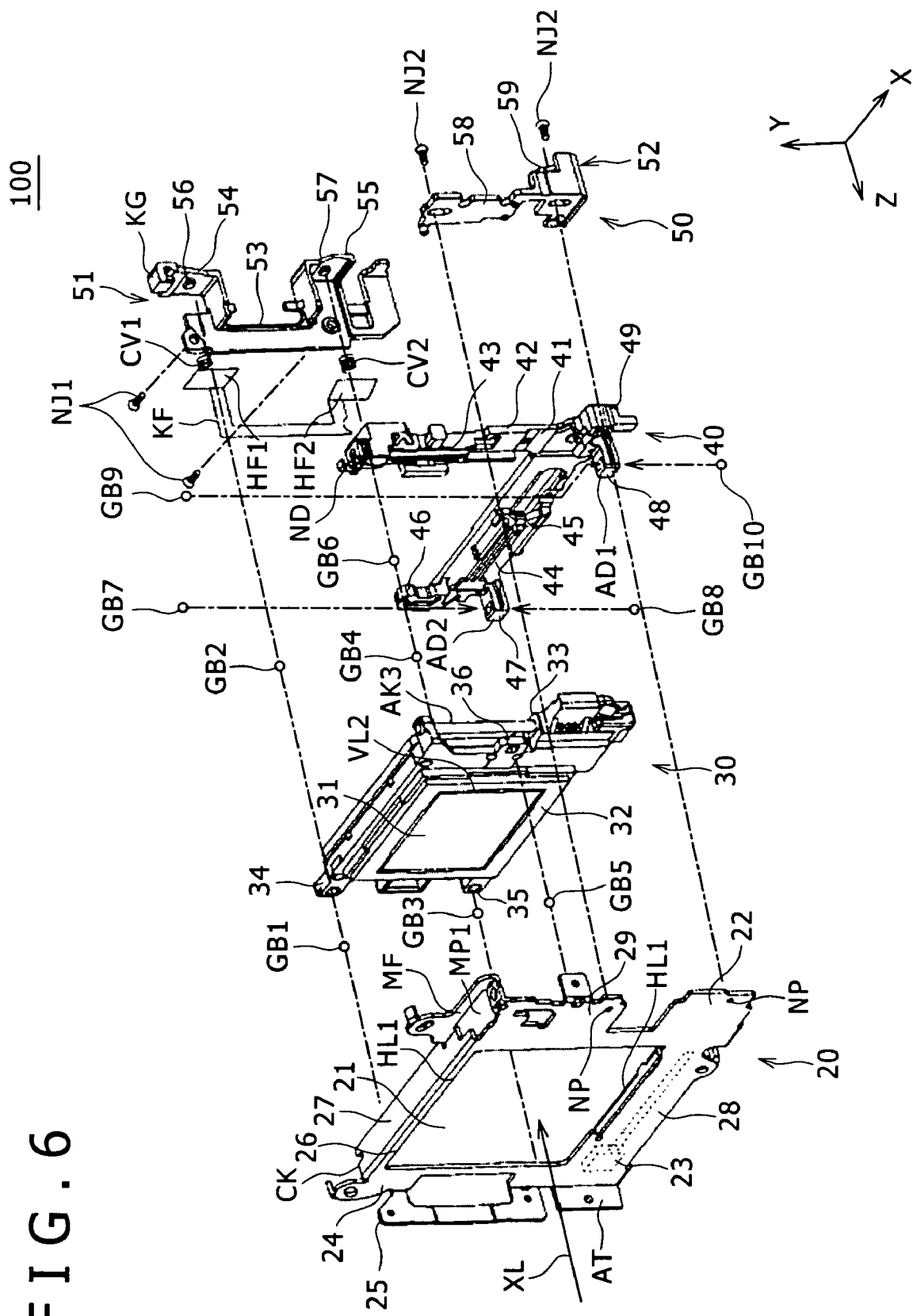
FIG. 6 is a schematic exploded perspective view illustrating a configuration of the image pickup apparatus.
Figure 7:
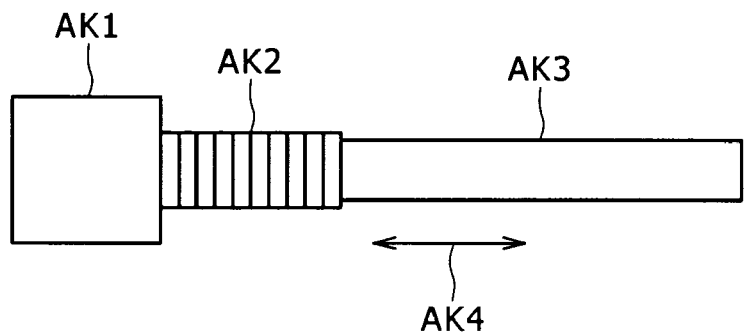
FIG. 7 illustrates a piezoelectric actuator.

A description is next given of a configuration of the image stabilizer unit 100 built in the image pickup apparatus 1. FIGS. 5 and 6 are exploded perspective views schematically illustrating the image stabilizer unit 100. Specifically, FIG. 5 is an exploded perspective view of the image stabilizer unit 100 as viewed from the front side and FIG. 6 is an exploded perspective view of the image stabilizer unit 100 as viewed from the rear side. FIG. 7 illustrates a piezoelectric actuator 23, 33.

Referring to FIGS. 5 and 6, the image stabilizer unit 100 includes a base plate 20 (also called "the holding base"); a first slider 40 displaced in an X-axial direction with respect to the base plate 20; a second slider 30 (also called "the imaging element folder") displaced in a Y-axial direction with respect to the first slider; and a holding member 50. In the image stabilizer unit 100, the first and second sliders 40, 30 as displacement bodies are held from ±Z-directions by the base plate 20 as a stationary body and the holding member 50 as a stationary body. The image stabilizer unit 100 configured as described above operates as a drive device for displacing the displacement bodies with respect to the stationary bodies. In the following, the image stabilizer unit 100 is described in further detail. It is to be noted that the upside, downside, left and right used in the following are determined based on the orientation of FIG. 5. Specifically, the up-direction is a +Y-direction, the down-direction is a −Y-direction, the left direction is +X-direction and the right direction is a −X-direction.

The base plate 20 is formed such that a rectangular metal flat plate (a metal frame) having a rectangular opening portion 21 at its generally central portion serves as a base member. In addition, the base plate 20 serves as a stationary base of the image stabilizer unit 100 in the state where the base plate 20 is attached to the inside the image pickup apparatus 1.

A right (−X-side) longitudinal frame 24, of the metal frame 22, is provided at its external edge with an attachment portion 25 used to fixedly attach thereto a first holding member 51 described later and with an attachment portion AT used to attach thereto a rising-bent member AM described later. The longitudinal frame 24 is also called the right frame. An upper (+Y-side) lateral frame 26 (FIG. 6), of the metal frame 22, is provided with a rising-bent flat plate 27. The lateral frame 26 is also called the upper frame. The rising-bent flat plate 27 has a notch CK adapted to receive the first holding member 51 engaged therewith and an opening MP1 adapted to receive part of the first slider 40 fitted thereto. A yaw-directional actuator 23 is provided on a lower (−Y-side) lateral frame 28, of the metal frame 22, so as to extend along a lateral-side portion HL1 of the opening portion (in the X-axial direction). The lateral frame 28 is also called the lower frame. A left (+X-side) longitudinal frame 29, of the metal frame 22, is provided with screw holes NP used to fixedly provide thereat a second holding member 52 described later. The left longitudinal frame is also called the left frame.

The second slider 30 is a resin-made frame 32 and is provided at its generally center with a rectangular opening portion 31 capable of housing and securing the imaging element 15 thereto. The right side of the frame 32 is provided with a rigid sphere receiver 34 at its upper end and with a rigid sphere receiver 35 at its lower end. The rigid sphere receiver 34 is adapted to receive rigid spheres GB1, GB2 loosely fitted thereto on both surfaces vertical to the Z-axis. The rigid sphere receiver 35 is adapted to receive rigid spheres GB3, GB4 loosely fitted thereto on both surfaces vertical to the Z-axis. A pitch-directional actuator 33 is provided on the left-side of the frame 32 so as to extend along a longitudinal side portion VL2 of the opening portion (in the Y-axial direction). In addition, the left-side of the frame 32 is provided with a rigid sphere receiver 36 (FIG. 6) at its general center. The rigid sphere receiver 36 is adapted to receive a rigid sphere GB5 loosely fitted thereto on one surface vertical to the Z-axis. Specifically, the one surface vertical to the Z-axis is a +Z-directional plane serving as a front surface in the plane vertical to the Z-axis.

A detailed description is given of the piezoelectric actuators 23, 33 included in the image stabilizer unit 100. As illustrated in FIG. 7, the yaw-directional actuator 23 and the pitch-directional actuator 33 each include a lamination type piezoelectric element AK2 formed like a rod by overlapping ceramics; a rectangular stationary member AK1 connected to one end side of the piezoelectric element AK2 in the lamination direction thereof; and a carbon-made drive rod AK3 (also called "the drive shaft") connected to the other end in the lamination direction. The piezoelectric element AK2 has the property of expanding and contracting in the lamination direction in response to applied voltage. The piezoelectric actuators 23, 33 having the configuration described above are designed such that the drive shaft AK3 is displaced in the lamination direction (the direction indicated with arrow AK4 in FIG. 7) in response to the expansion and contraction of the piezoelectric element AK2.

The description is continued returning to FIGS. 5 and 6. The first slider 40 is formed such that an L-shaped resin-made frame 41 serves as a base member. The L-shaped resin-made frame 41 has a frame 42 extending in the +Y-direction and a frame 44 extending in −X-direction. The frame 42 is also called "the vertical frame" and the frame 44 is also called "the horizontal frame." The vertical frame 42 is fixedly provided with a bearing portion 43 (FIG. 6) on the +Z-directional side surface. The bearing portion 43 is also called "the friction joint portion" and has a V-groove adapted to receive the drive shaft AK3 of the pitch-directional actuator 33 slidably fitted thereto. The friction joint portion 43 is disposed at a position facing the drive shaft AK3 of the pitch-directional actuator 33 of the second slider 30. The vertical frame 42 is provided at its extending end with a fitting portion ND to be fitted to the opening MP1 of the base plate 20. On the other hand, the horizontal frame 44 is provided at its general center with a rectangular opening MP2 (FIG. 5) whose longitudinal direction corresponds to the X-axial direction. A member 45 longitudinally traversing the opening MP2 is provided at the −X-side end portion of the opening MP2. This member 45 function as a drive force transmitted portion adapted to undergo a drive force from the yaw-directional actuator 23. The drive force transmitted portion is also simply called "the transmitted portion." The horizontal frame 44 is provided at its extending end with a rigid sphere receiver 46. The rigid sphere receiver 46 is adapted to receive rigid spheres GB4, GB6 loosely fitted thereto on both surfaces vertical to the Z-axis.

The L-shaped frame 41 is provided with projecting portions AD1, AD2 projecting in the +Z-direction at both ends of the lower side of the horizontal frame 44. The projecting portion AD1 is provided with a rigid sphere receiver 48, which is adapted to receive rigid spheres GB9, GB10 loosely fitted thereto on both surfaces vertical to the Y-axis. The projecting portion AD2 is provided with a rigid sphere receiver 47, which is adapted to receive rigid spheres GB7, GB8 loosely fitted thereto on both surfaces vertical to the Y-axis.

The projecting portions AD1, AD2 constitute a yaw-directional (X-axial directional) guide mechanism of the first slider 40. Specifically, the projecting portions AD1, AD2 function as a guided device with respect to a yaw-directional guide member provided on the base plate 20 in the state where the base plate 20 and the first slider 40 are assembled to each other. That is to say, in the state where the image stabilizer unit 100 is assembled, the shiftable direction of the projecting portions AD1, AD2 as the guided device are limited by the guide member of the base plate 20. In this way, the first slider 40 can slidably be displaced in the X-axial direction in response to a drive force applied from the yaw-directional actuator 23 via the drive force transmitted portion 45. Incidentally, the details of the yaw-directional guide mechanism are described later.

The holding member 50 includes a first holding member 51 and a second holding member 52 and has a function of pressing a displacement body against the base plate 20.

Specifically, as illustrated in FIG. 6, the first holding member 51 includes a resin-made first member 53 as a base member; coil springs CV1, CV2; and a metal body KF having two rigid sphere receiver flat plates HF1, HF2. The first member 53 has generally rectangular holding portions 54, 55 which hold the corresponding moving bodies (the first slider and the second slider 30) in cooperation with the base plate 20. The holding portions 54, 55 are projectingly provided with respective spring attachment portions 56, 57. The coil springs CV1, CV2 are attached to the respective spring attachment portions 56, 57 so that the projecting direction of the spring attachment portions 56, 57 may be the extending direction of the coil springs CV1, CV2. The metal body KF is placed on the first member 53 so that the rigid sphere receiver flat plates HF1, HF2 of the metal body KF may press the respective coil springs CV1, CV2 from the extension and contraction direction of the coil springs CV1, CV2, that is, the coil springs CV1, CV2 may be compressed by the respective rigid sphere receiver flat plates HF1, HF2.

The second holding member 52 is composed of a resin-made member and includes a stationary flat plate 58 secured to the base plate 20 with screws NJ2 and a holding flat plate 59 pressing the displacement bodies from the +Z direction. In the state where the stationary flat plate 58 is secured to the base plate 20, a corner portion 49 projecting outwardly (here, in the +X-direction) at a bent portion of the first slider 40 exists between the stationary flat plate 58 and the holding flat plate 59. In addition, the corner portion 49 is pressed in the +Z-direction by the holding flat plate 59.

When the image stabilizer unit 100 is assembled, the imaging element 15 is fitted to and fixedly provided in the opening portion 31 of the second slider 30. In addition, the drive shaft AK3 of the pitch-directional actuator 33 and the friction joint portion 43 of the first slider 40 are friction-joined together. With this, the second slider 30 is held by the first slider 40 (the held state). In addition, the second slider 30 can slidably be displaced in the pitch-direction (the Y-axial direction) with respect to the first slider 40 in response to the drive force applied from the pitch-directional actuator 33. In this held state, the rigid sphere receiver 46 provided at the extension end of the horizontal frame 44 of the first slider 40 and the rigid sphere receiver 35 provided in the frame 32 of the second slider 30 are brought into contact with each other via the rigid sphere GB4. Since the first slider 40 and the second slider 30 are brought into contact with each other via the ball bearing as described above, the second slider 30 is slidably displaced in the Y-axial direction smoothly.

When the displacement body is attached to the base plate 20, the fitting portion ND of the displacement body is fitted to the opening MP1 of the base plate 20. In addition, in the state where the corner portion 49 of the displacement body is sandwiched between the stationary flat plate 58 of the second holding member 52 and the holding flat plate 59, the second holding member is fixedly provided on the base plate 20 with the screws NJ2. In the state where a hook-like engaging portion KG provided adjacently to the pressing portion 54 is engaged with a notch CK, the first holding member 51 is fixedly provided on the attachment portion 25 of the base plate 20 with screws NJ1.

In the built-up state (the assembled state) as described above, the right end of the displacement body is held at two points between the first holding member 51 and the right frame 24 of the base plate 20. Specifically, in the assembled state, while being sandwiched between the right frame 24 and the rigid sphere receiver flat plate HF1 of the first holding member 51 via the rigid spheres GB1, GB2, the rigid sphere receiver 34 existing at the right end upper portion of the displacement body (here, the second slider 30) is held by the biasing force of the coil spring CV1. In addition, while being sandwiched between the right frame 24 and the rigid receiver flat plate HF2 of the first holding member 51 via the rigid spheres GB3, GB4, the rigid sphere receivers 35 and 46 existing at the right end lower portions of the displacement bodies and brought into contact with each other via the rigid sphere GB4 are held by the biasing force of the coil spring CV2.

In the assembled state, the left ends of the displacement bodies are sandwiched between the second holding member 52 and the left frame 29 of the base plate 20. Specifically, while the fitting portion ND existing at the left end upper portion of the displacement body is fitted to the opening MP1 of the base plate 20, the corner portion 49 existing at the left end lower portion of the displacement body is held by undergoing the +Z-directional force applied from the holding flat plate 59 of the second holding member 52. In addition, the rigid sphere receiver 36 existing at the center of the left end of the displacement body is held by undergoing the −Z-directional force from the left frame 29 of the base plate 20 via the rigid sphere GB5.

Incidentally, in the image stabilizing unit 100, rotary rollers RL1 and RL2 are built in the fitting portion ND and the corner portion 49, respectively. See FIG. 5. This can reduce a friction force occurring between the corner portion 49 and the holding flat plate 59 and between the fitting portion ND and the edge (lip) MF of the opening MP1 when the displacement body is displaced in the X-axial direction.

As described above, the displacement bodies are sandwiched between the base plate 20 and the holding member 50. The displacement body on the +Z-direction side is brought into contact with the base plate 20 via the three rigid spheres (the three ball bearings of the second slider 30). In addition, the displacement body on the −Z-direction side is brought into contact with the holding member 50 via the rotary roller RL2 at the corner portion 49 of the first slider 40, the ball bearings of the second slider 30 and the ball bearing of the first slider 40. In the image stabilizer unit 100 having the displacement body holding mechanism described above, the optical-axial position of the displacement body relative to the base plate 20 as the stationary base is defined by the three ball bearings on the +Z-direction side.

Since the displacement bodies and the stationary body are brought into contact with each other via the ball bearings and the rotary rollers, the displacement bodies are smoothly displaced in the yaw-direction (the X-axial direction) and in the pitch-direction (the Y-axial direction).

[Yaw-Directional Guide Mechanism]

Figure 8:
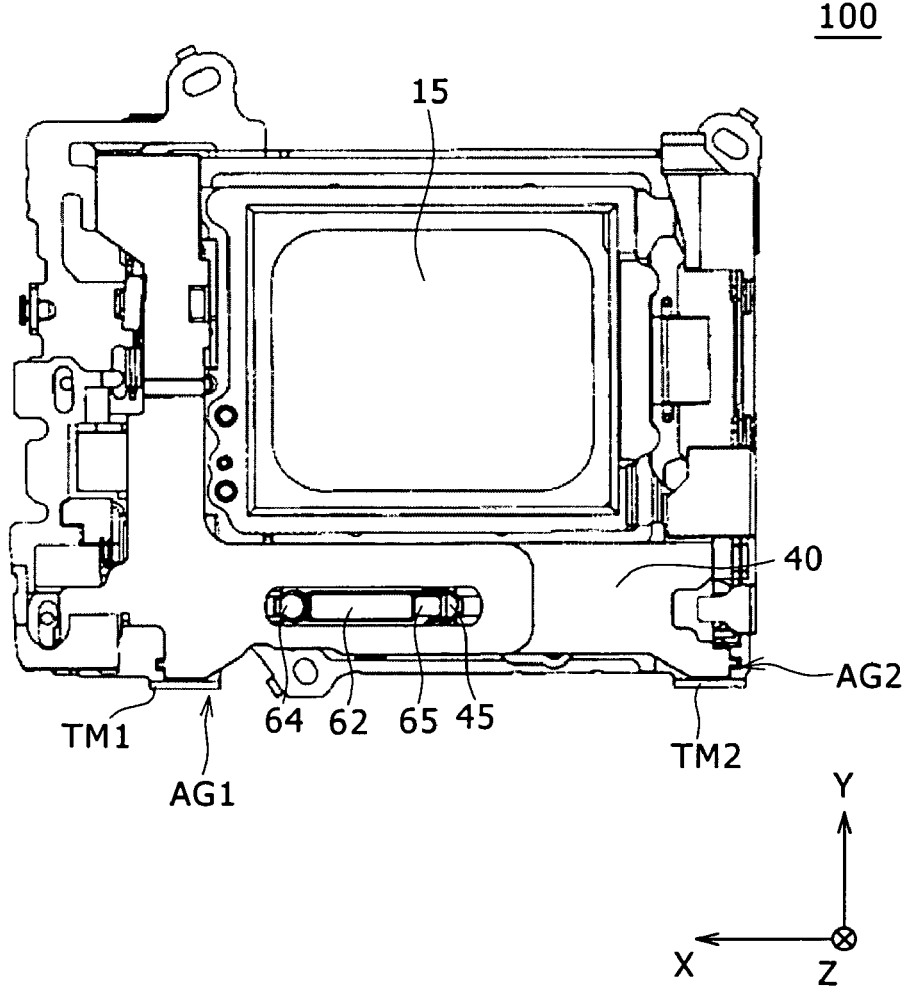
FIG. 8 is a front view of the image stabilizer unit.
Figure 9:
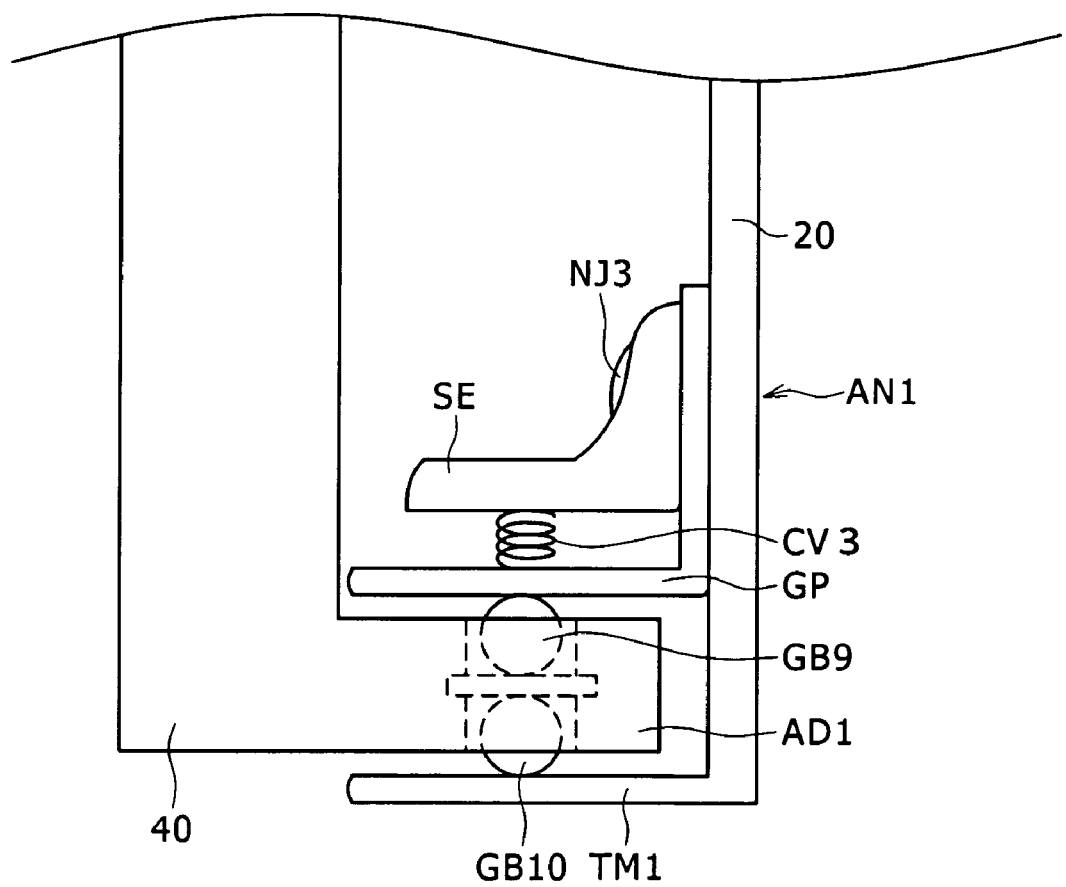
FIG. 9 is a cross-sectional view of a guide mechanism in a Y-Z plane.
Figure 10:
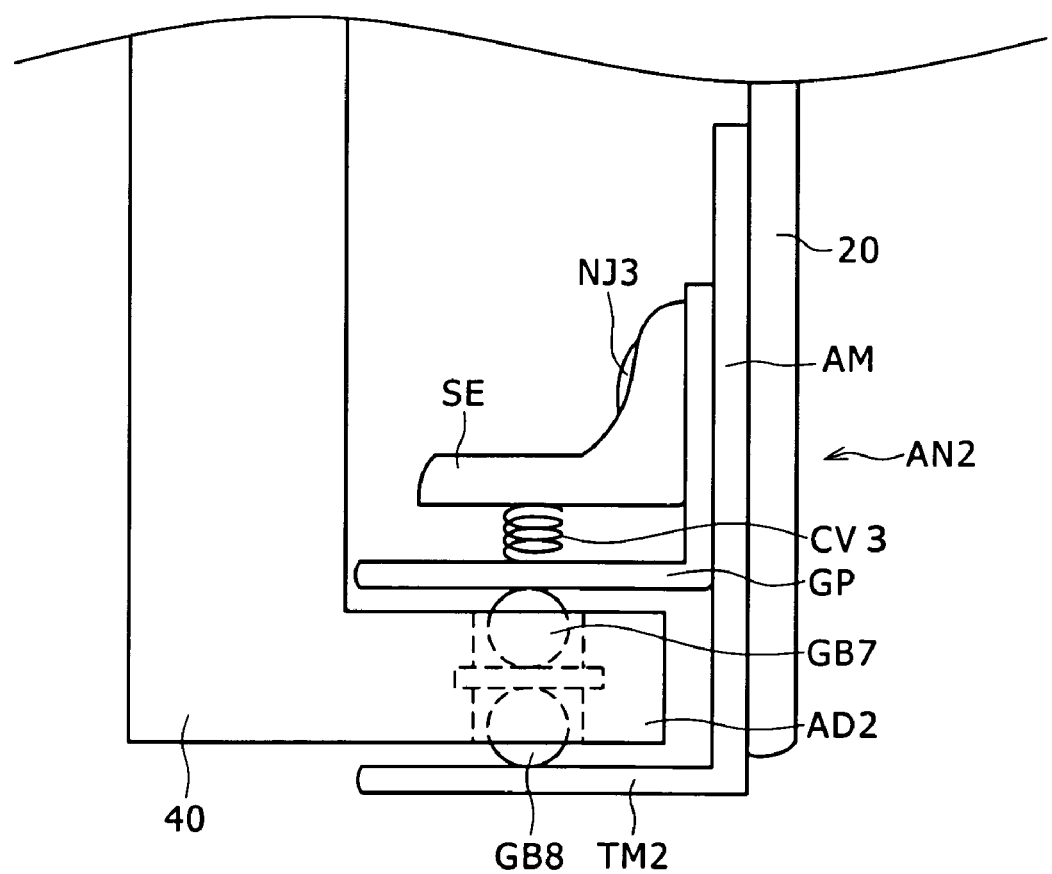
FIG. 10 is a cross-sectional view of another guide mechanism in a Y-Z plane.

A description is next given of a yaw-guide mechanism of the image stabilizer unit 100. FIG. 8 is a front view of the image stabilizer unit 100. FIG. 9 is a cross-sectional view of a guide mechanism AG1 in a Y-Z plane. FIG. 10 is a cross-sectional view of a guide mechanism AG2 in a Y-Z plane.

As illustrated in FIG. 5, the rising-bent member AM having a rise-bent portion TM2 is attached to the attachment portion AT provided at the base plate 20, by means of a screw ANJ. In the state where the rising-bent member AM is attached to the attachment portion AT as described above, the base plate 20 has two rising-bent portions TM1, TM2 located at the lower-side end of the lower frame 28 and extending in the −Z-direction. In the assembled state of the image stabilizer unit 100 (FIG. 8), the rising-bent portions TM1 and TM2, along with a rigid sphere holding plate GP (FIG. 9) described later, constitute guide portions AN1 and AN2, respectively, which function as a guide device for guiding the yaw-directional displacement of the first slider 40. In the assembled state of the image stabilizer unit 100, the guide device, along with the projecting portions AD1, AD2 serving as guided device provided on the first slider 40, constitute guide mechanisms.

The guide mechanisms AG1, AG2 are further described in detail in the following.

Referring to FIG. 9, the guide portion AN1 constituting of the guide mechanism AG1 includes a rising-bent portion TM1 extending in the −Z-direction from the base plate 20 and a rigid sphere holding plate GP disposed to face the rising-bent portion TM1.

The rigid sphere holding plate GP is attached to base plate 20 with a screw NJ3 so as to be slidable in the Y-axial direction. In addition, the rigid sphere holding plate GP is attached in the state where an elastic member (here, a coil spring) extensible in the Y-axial direction is put between the rigid sphere holding plate GP and a stopper portion SE secured to the base plate 20 with the screw NJ3. In the guide portion AN1 having such a configuration, the elastic member CV3 functions as a pressing device for pressing the rigid sphere holding plate GP toward the rising-bent portion TM1. In other words, the rigid sphere holding plate GP is pressed in the −Y-direction by undergoing an elastic force applied from the elastic member CV3.

To assemble the base plate 20 and the first slider 40 together, the projecting portion AD1 of the first slider 40 is fitted into between the rigid sphere holding plate GP and the rising-bent portion TM1 with the rigid sphere holding plate GP temporarily lifted in the +Y-direction. In this way, the guide mechanism is configured in the assembled state. The projecting portion AD1 of the first slider 40 is held between the rigid sphere holding plate GP and the rising-bent portion TM1 via the rigid spheres GB9, GB10 while undergoing the −Y-directional force from the rigid sphere plate GP.

Referring to FIG. 10, the guide portion AN2 has almost the same configuration as that of the guide portion AN1. The guide mechanism AG2 is configured such that the projecting portion AD2 of the first slider 40 is held between the rising-bent portion TM2 and the rigid sphere holding plate GP.

Since the guide mechanisms AG1, AG2 described above are provided, the Y-axial movement of each of the projecting portions AD1, AD2 of the first slider 40 is suppressed by the elastic force of the elastic member CV3. Thus, the first slider 40 can slidably be displaced in the X-axial direction without departing in the Y-axial direction.

Incidentally, the second slider 30 is not provided with a guide mechanism for guiding the pitch-directional slidable displacement. This is because of employing the following configuration. The drive shaft AK3 of the pitch-directional actuator 33 for pitch-directional displacement is gripped by the friction joint portion provided in the first slider 40. In addition, the drive shaft AK3 of the pitch-directional actuator 33 has also a function as a guide device for guiding the Y-axial linear displacement of the second slider 30.

Figure 11:
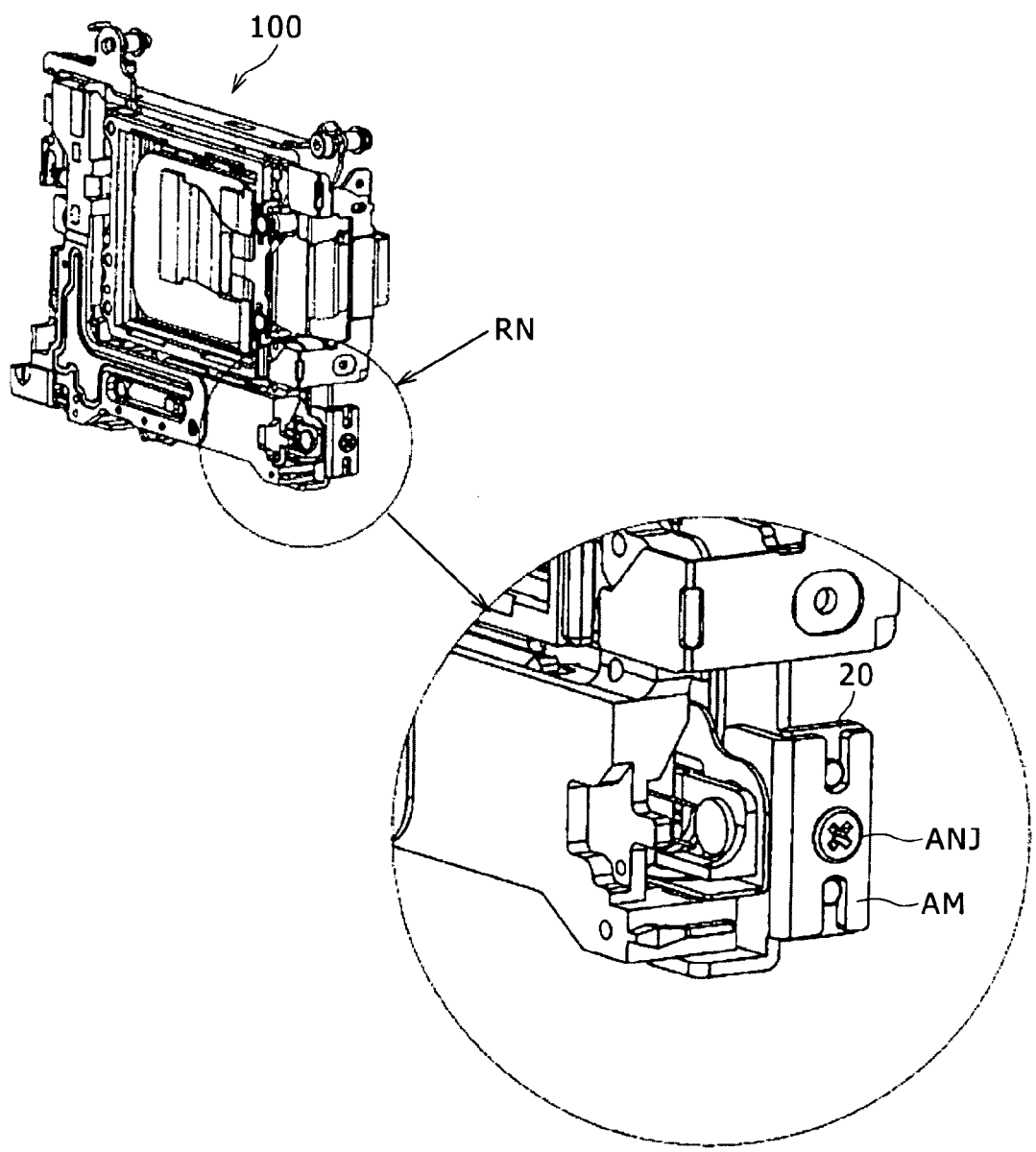
FIG. 11 is a partially enlarged view of the image stabilizer unit.
Figure 12:
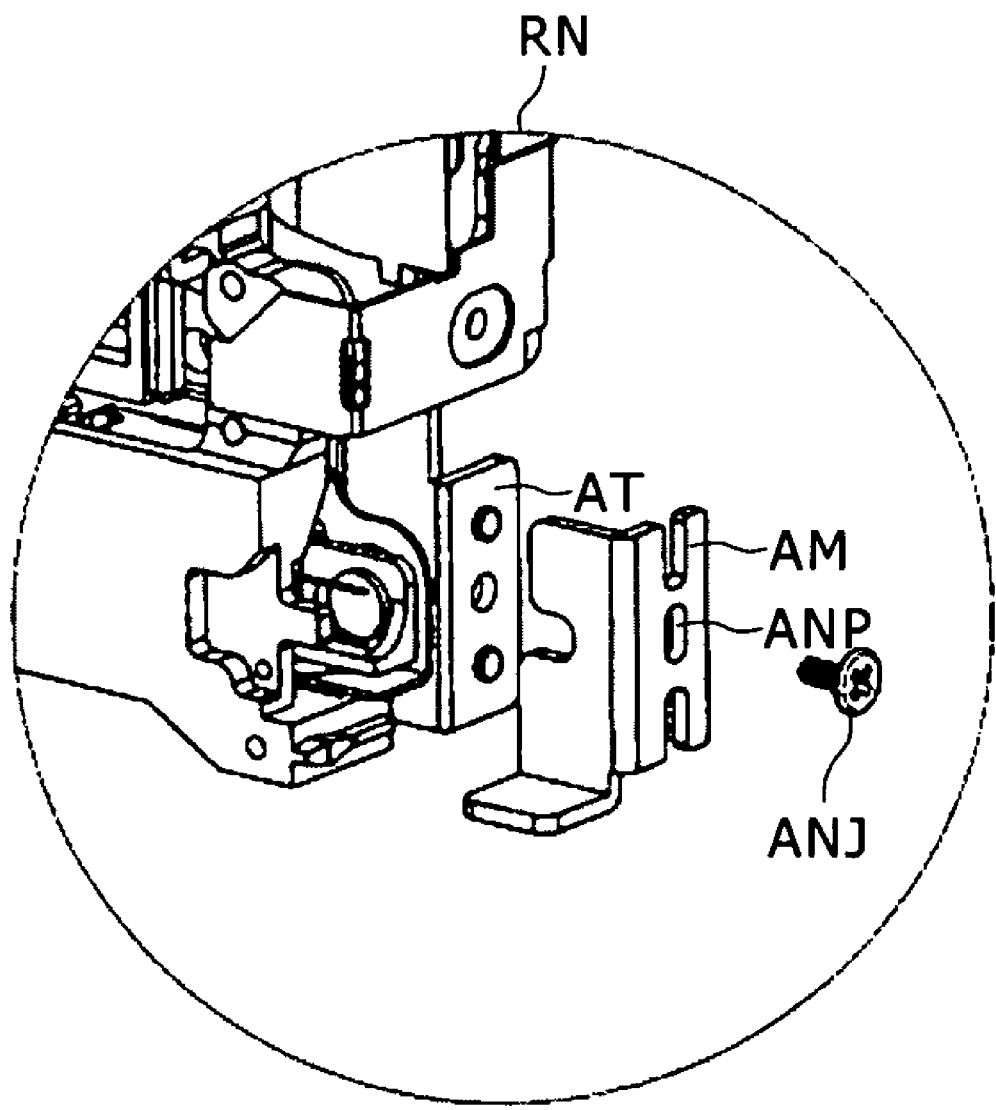
FIG. 12 illustrates a state where a base plate is removed from a rising-bent member constituting part of the guide mechanism.
Figure 13:
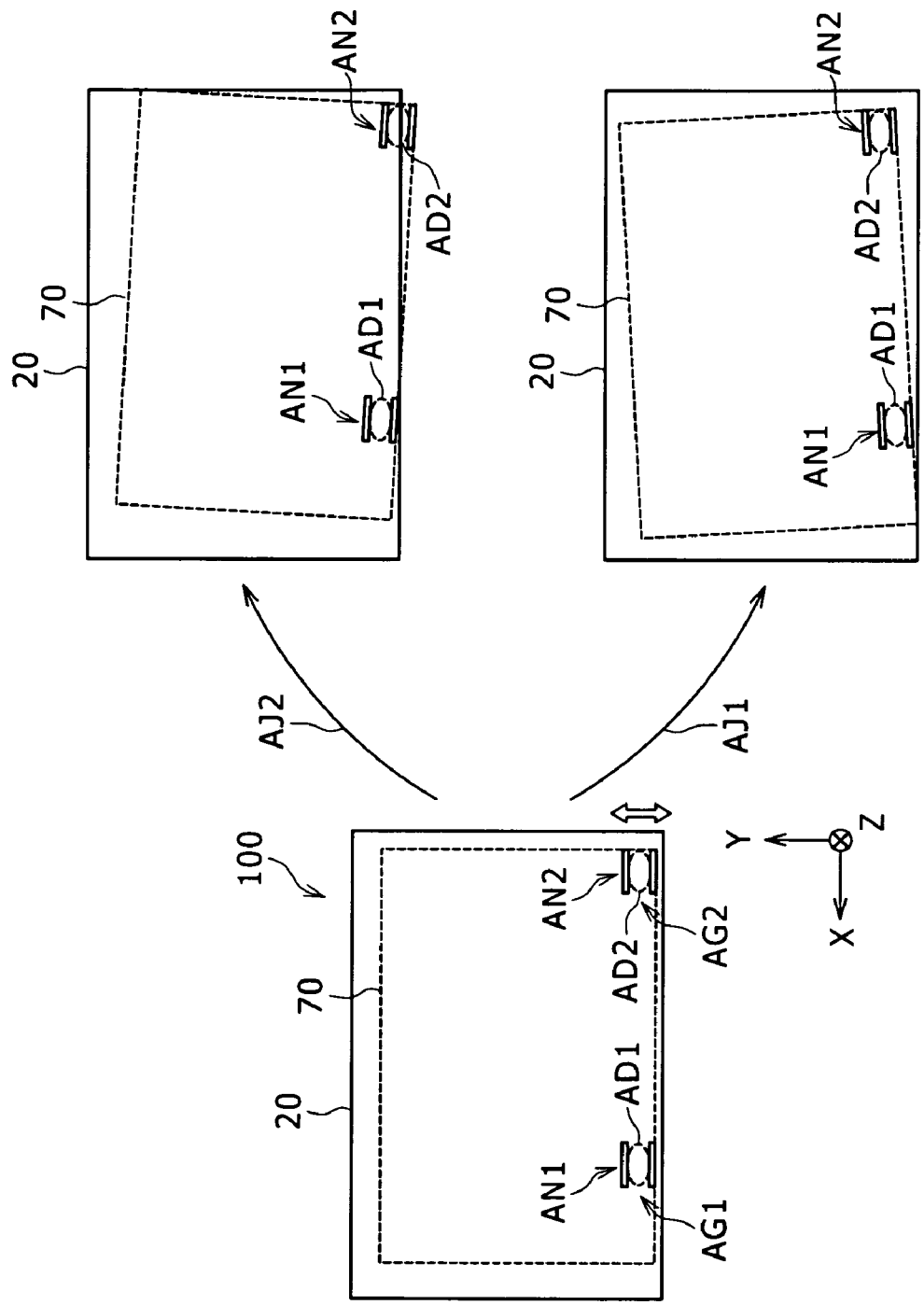
FIG. 13 is a diagram for assistance in explaining a positional relationship between the base plate and a displacement body in an assembled state.
Figure 14:
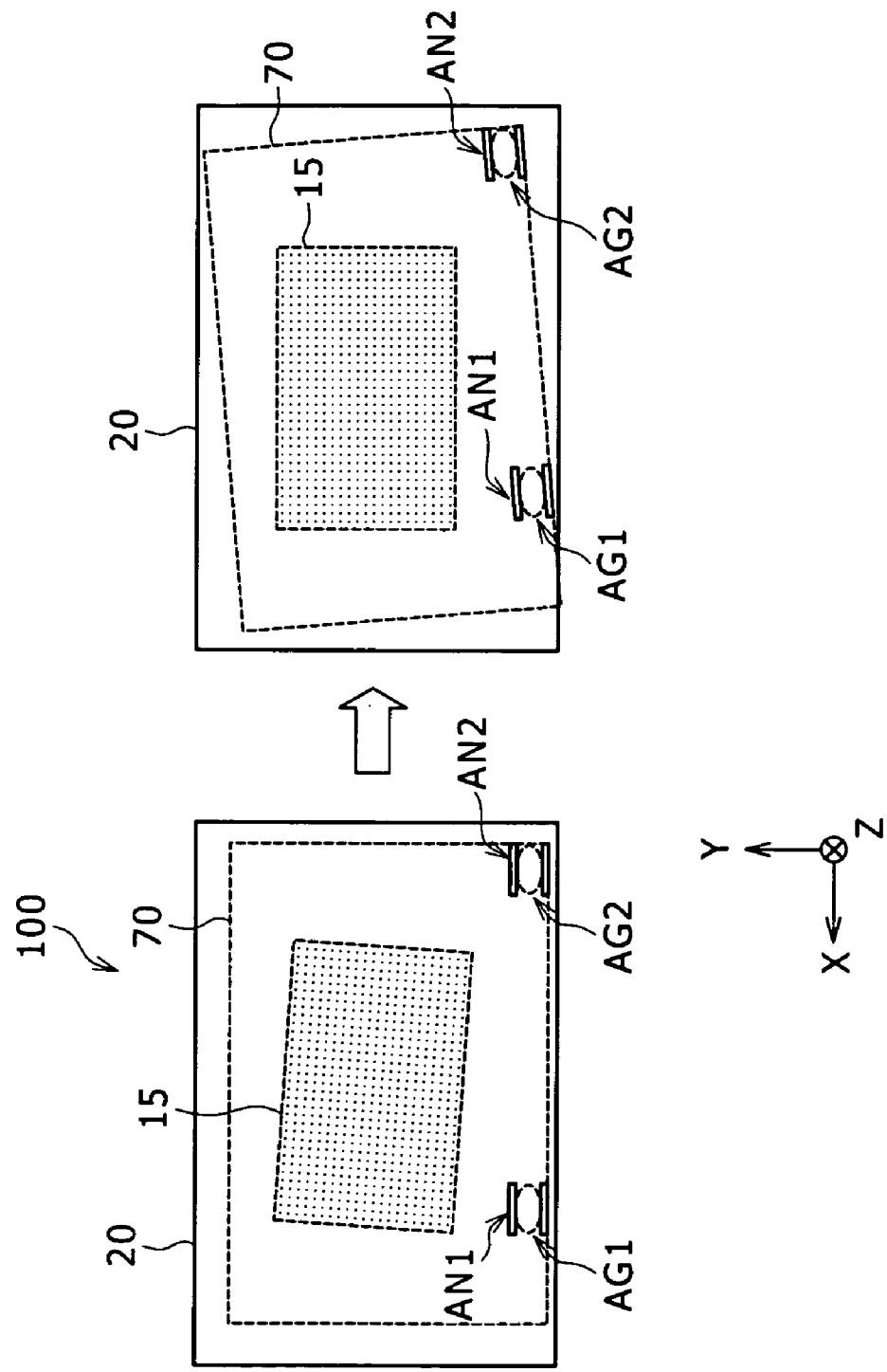
FIG. 14 illustrates a condition of correcting a turning error of an imaging element.
Figure 15:
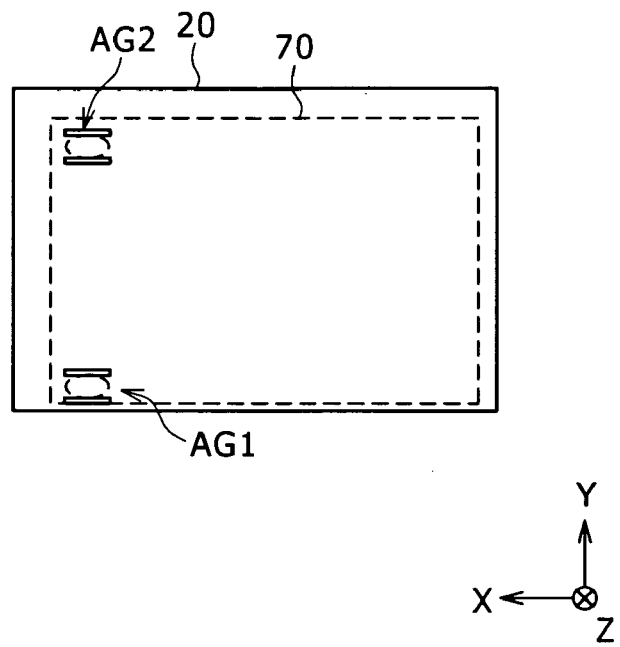
FIG. 15 illustrates installation of the guide mechanisms by way of example.
Figure 16:
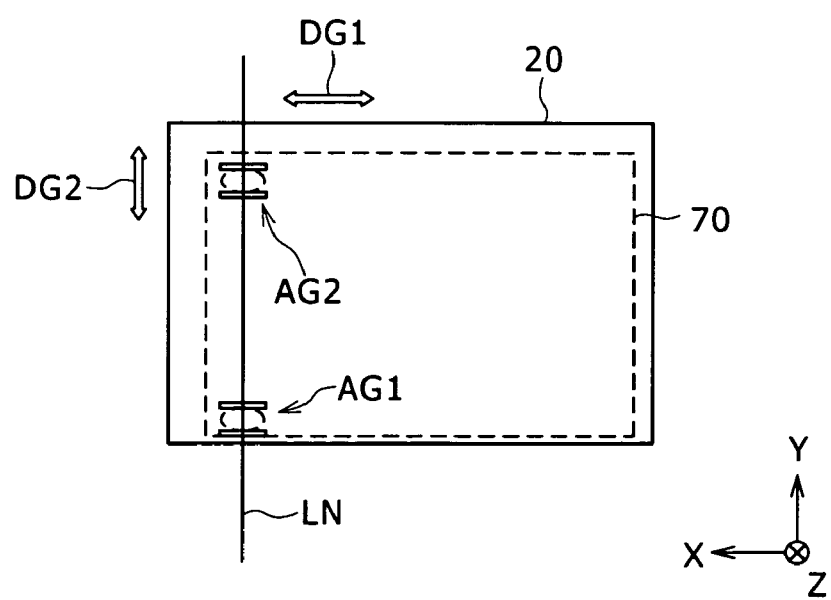
FIG. 16 is a diagram for assistance in explaining a displacement direction of the guide mechanisms.
Figure 17:
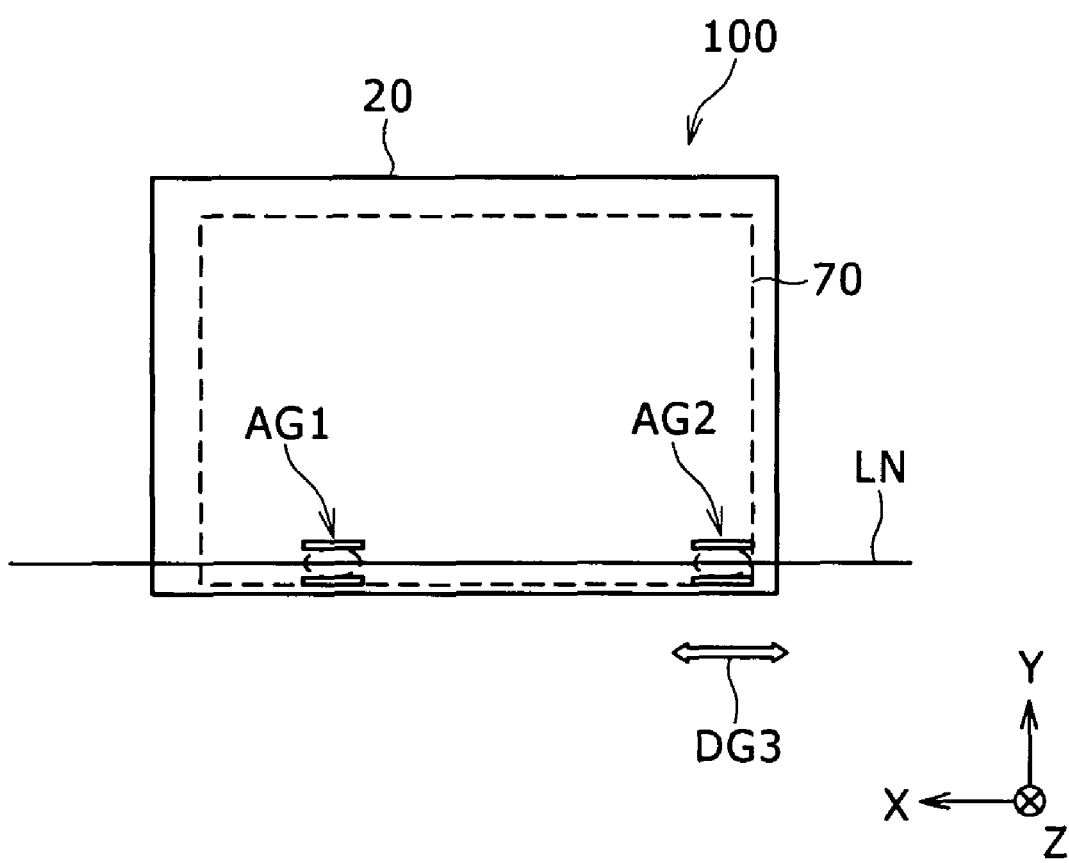
FIG. 17 is a diagram for assistance in explaining a displacement direction of the guide mechanisms.

In the image stabilizer unit 100, the guide mechanism AG2 is configured to be able to adjust its position. FIG. 11 is an enlarged view illustrating an area surrounded by a circle RN in the image stabilizer unit 100. FIG. 12 illustrates a state where the rising-bent member AM constituting part of the guide mechanism AG2 is removed from the base plate 20. FIG. 13 is a view for assistance in explaining the positional relationship between the base plate 20 and a displacement body 70 in an assembled state. FIG. 14 illustrates a condition of correcting the rotary error of the imaging element 15. FIG. 15 illustrates an installation example of the guide mechanism AG2. FIGS. 16 and 17 are diagrams for assistance in explaining displacement directions of the guide mechanism AG2. Incidentally, in FIGS. 13 to 17, the base plate 20, the guide portions AN1, AN2, the displacement body 70, and projecting portions AD1, AD2 are simply illustrated. In addition, the members on the side of the base plate 20 are depicted with solid lines and the members on the side of the displacement body 70 are depicted with broken lines.

Specifically, as illustrated in FIG. 11, the rising-bent member AM constituting part of the guide mechanism AG2 is attached to the base plate 20 with the screw ANJ. However, a screw hole ANP of the rising-bent member AM is formed like an ellipse elongate in the Y-axial direction as illustrated in FIG. 12. Therefore, after the attachment of the rising-bent member AM, the screw ANJ is loosened and the position of the rising-bent member AM is shifted in the Y-axial direction to change the position of the rising-bent portion TM2 in the Y-axial direction.

The rigid sphere plate GP is configured to be slidable in the Y-axial direction while undergoing the elastic force from the elastic member CV3. Therefore, if the position of the rising-bent portion TM2 is changed in the Y-axial direction with the projecting portion AD2 held between the rising-bent portion TM2 and the rigid sphere holding plate GP, then the position of the guide portion AN2 is shifted in the Y-axial direction.

In this way, the image stabilizer unit 100 is configured such that the guide portion AN2 can positionally be changed in the direction (the Y-axial direction) vertical to the displacement direction of the displacement body 70 in a plane parallel to a plane including a light-receiving surface of the imaging element 15 by adjusting the position of the rising-bent member AM. The plain including the light-receiving surface is also called "the imaging element plane." With this configuration, if the projecting portion AD2 is displaced in response to the positional change of the guide portion AN2, the displacement body 70 having the projecting portion AD2 is turnably displaced in the plane parallel to the imaging element plane with the guide mechanism AG1 serving as a fulcrum.

Specifically, as illustrated in FIG. 13, if the guide portion AN2 is displaced in the +Y-direction, the posture of the displacement body 70 is changed into a condition indicated with arrow AJ1. That is to say, if the guide portion AN2 is displaced in the +Y-direction, the projecting portion AD2 gripped by the guide portion AN2 is displaced in the +Y-direction in accordance with the amount of displacement of the guide portion AN2. Therefore, the displacement body 70 is turned (tilted) counterclockwise in the X-Y plane with the projecting portion AD1 serving as a fulcrum.

On the other hand, if the guide portion AN2 is displaced in the −Y-direction, the posture of the displacement body 70 is changed in a condition indicated with arrow AJ2. In other words, if the guide portion AN2 is displaced in the −Y-direction, the projecting portion AD1 held by the guide portion AN1 is displaced in the −Y-direction in accordance with the amount of displacement of the guide portion AN2. Therefore, the displacement body 70 is turned clockwise in the X-Y plane with the projecting portion AD1 serving as a fulcrum.

As described above, the image stabilizer unit 100 capable of turning the displacement body 70 in the X-Y plane can correct an turning error of the imaging element 15 occurring at the time of building up the image stabilizer unit 100.

Specifically, the image stabilizer unit 100 is configured using a large number of members. Therefore, in the assembled state, for example, the imaging element 15 receiving object light may excessively be turned from a posture as a reference in the plane including the light-receiving surface of the imaging element 15 in some cases. If the image stabilizer unit 100 is mounted to the image pickup apparatus 1 in the state of having such a turning error, a tilted image not intended by a user can be obtained.

To eliminate such a thing, in the image stabilizer unit 100 of the present embodiment, the position of the guide portion AN2 is changed and the displacement body 70 is turned in the plane parallel to the imaging element plane. This corrects the turning error of the imaging element 15 mounted to the displacement body 70. For example, the imaging element may be turned clockwise in the assembled state as illustrated in FIG. 14. In such a case, the guide portion AN2 is displaced in the +Y-direction to turn the displacement body 70 counterclockwise. In this way, also the imaging element 15 mounted to the displacement body 70 is turned counterclockwise to correct the turning error of the imaging element 15.

In the image stabilizer unit 100 of the present embodiment described above, while one guide mechanism AG1 of the two guide mechanisms AG1, AG2 is allowed to serve as a fulcrum, the position of the other guide mechanism AG2 is adjusted and the displacement body 70 can be turned in the plane parallel to the imaging element plane. Thus, the turning error of the imaging element 15 mounted to the displacement body 70 can be corrected.

Incidentally, in the image stabilizer unit 100 of the present embodiment, the two guide mechanisms AG1, AG2 are mounted in the X-axial direction, i.e., along the displacement direction of the first slider 40. However, the invention is not limited to this. The two guide mechanisms AG1, AG2 may be mounted at any position. For example, the two guide mechanisms AG1, AG2 may be mounted along the Y-axis as illustrated in FIG. 15.

The direction (displacement direction) where the guide mechanism AG2 capable of positional adjustment is displaced is determined based on the relative position between the drive direction of the first slider 40 and the guide mechanism AG1 serving as a fulcrum.

Specifically, the guide mechanism AG2 capable of positional adjustment is displaced in a direction different from the displacement direction of the first slider 40 in a plane parallel to the plane (also called "the imaging element plane" including the light-receiving surface of the imaging element 15. In other words, the guide mechanism AG2 is displaced in the direction different from the guide direction of the guide device. If a straight line LN is assumed that passes the guide mechanism AG1 serving as a fulcrum and the guide mechanism AG2 capable of positional adjustment, the guide mechanism AG2 is displaced in a direction different from a direction (also called "the linear direction") along the straight line LN in the plane parallel to the imaging element plane.

As illustrated in FIG. 16, for example, if the two guide mechanisms AG1, AG2 are mounted along the Y-axis, the guide mechanism AG2 is displaced in a direction different from both drive directions indicated with arrows DG1 in a plane parallel to the imaging element plane. In addition, the guide mechanism AG2 is displaced in a direction different from the linear direction indicated with both arrows DG2 in a plane parallel to the imaging element plane. As illustrated in FIG. 17, for example, if the two guide mechanisms AG1, AG2 are mounted along the X-axis (in the case of the image stabilizer unit 100 of the present embodiment), each of the drive direction and the linear direction are directions indicated with both arrows DG3. Thus, the guide mechanism AG2 is displaced in a direction different from the directions indicated with arrows DG3 in a plane parallel to the imaging element plane.

[Yaw-Directional Shifting of the Displacement Body]

Figure 18:
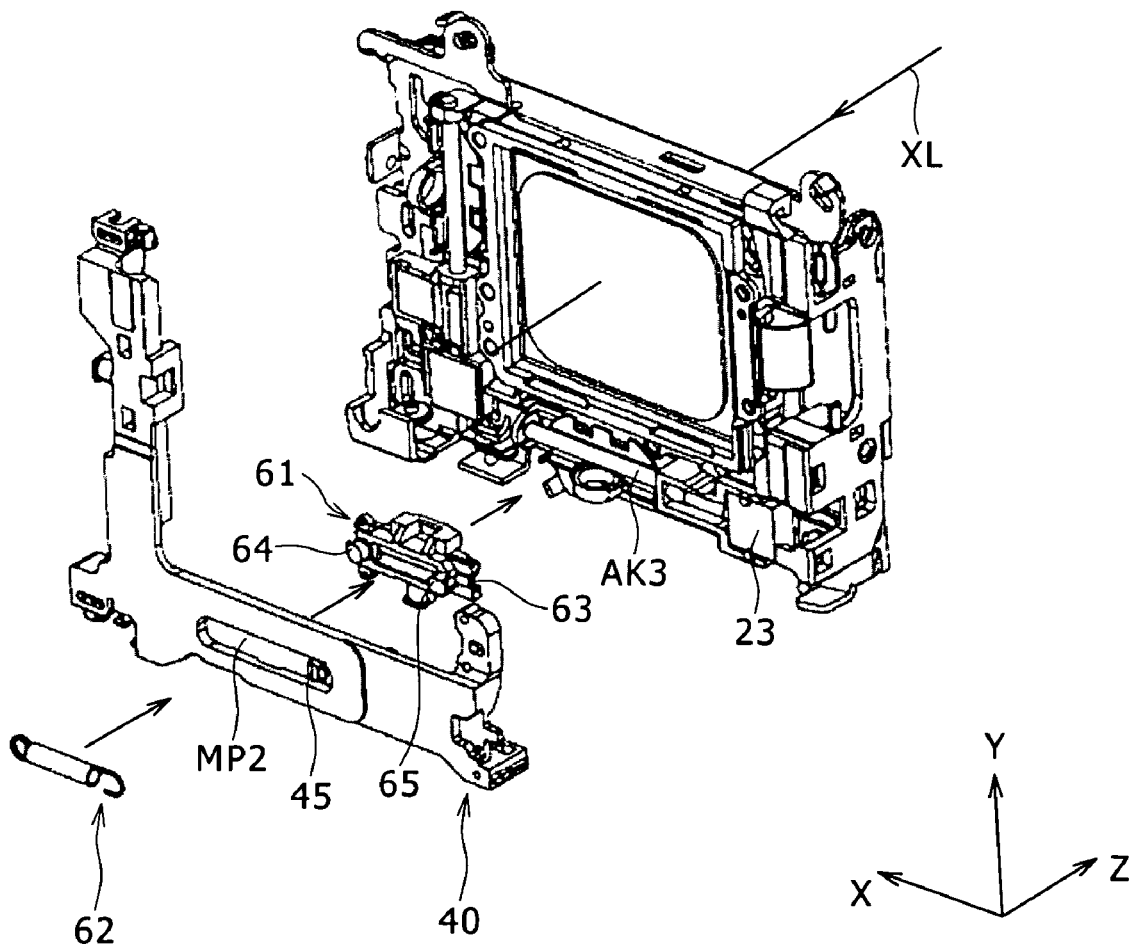
FIG. 18 is an exploded perspective view of a drive force transmission mechanism.
Figure 19:
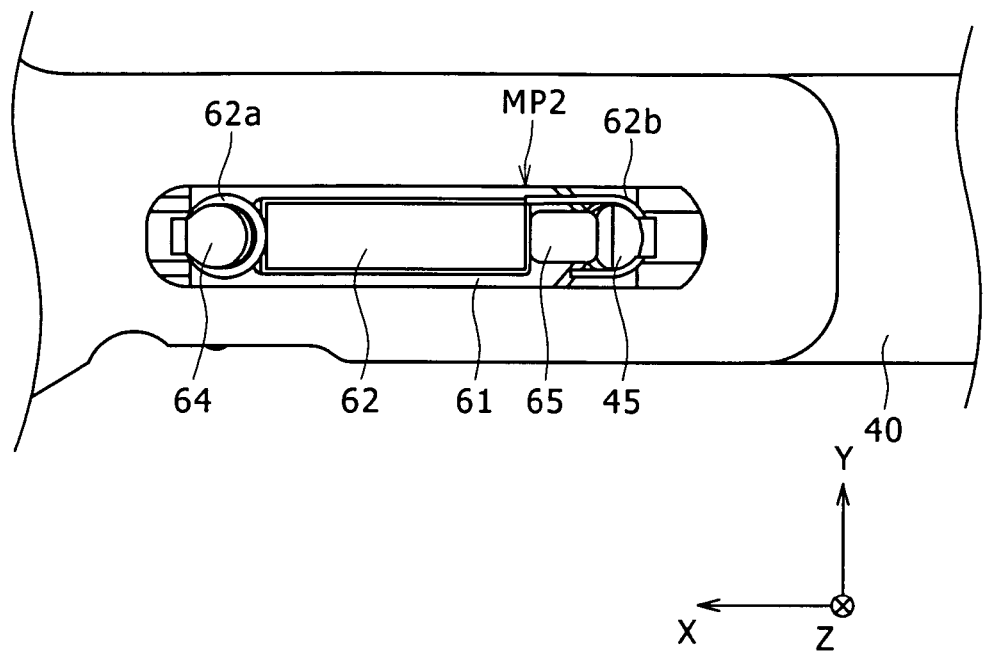
FIG. 19 is an external enlarged view of the drive force transmission mechanism.

A description is next given of yaw-directional shifting operation of the displacement body 70 in the image stabilizer unit 100. FIG. 18 is an exploded perspective view of a drive force transmission mechanism. FIG. 19 is an enlarged external view of the drive force transmission mechanism.

As described above, the yaw-directional actuator 23 generates a drive force (also called "the yaw-directional drive force") adapted to shift the displacement body 70 in the yaw-direction. The yaw-directional drive force is transmitted to the first slider 40 via a shift portion 61 friction-joined to the drive shaft AK3 of the yaw-directional actuator 23.

Specifically, as illustrated in FIG. 18, the image stabilizer unit 100 is configured to include the shift portion 61 and a biasing device (here, a coil spring) 62.

The shift portion 61 has a V-groove-shaped bearing portion (friction joint portion) 63, which is slidably fitted to the drive shaft AK3 of the yaw-directional actuator 23. In this way, the shift portion 61 is slidably displaced as a driven body on the drive shaft AK3 in response to the expansion and contraction motion of the piezoelectric element AK2

The shift portion 61 has a retaining projection 64 and a drive force transmission portion 65 on a surface opposite the surface on which the friction joint portion 63 exists. The drive force transmission portion 65 is also simply called "the transmission section" and is adapted to transmit a drive force to the first slider 40. The retaining projection 64 is located at a position where a vector heading toward the retaining projection 64 from the drive force transmission portion 65 is parallel to the X-axis. In the assembled state where the first slider 40 is fitted (FIG. 8), the retaining projection 64 and the drive force transmission portion 65 are fitted to the opening portion MP2 of the first slider 40.

Referring to FIG. 19, in the assembled state as described above, the drive force transmission portion 65 is disposed adjacently to the drive force transmitted portion 45 of the first slider 40 in the +X-direction with reference to the drive force transmitted portion 45. With this, in response to the displacement of the shift portion 61 in the −X-direction, the drive force transmitted portion 45 undergoes the −X-directional force from the drive force transmission portion 65 so that the first slider 40 is slidably displaced in the −X-direction.

To fit the shift portion 61 to the opening MP2 of the first slider 40, the shift portion 61 and the drive force transmitted portion 45 are biased by the biasing device. As illustrated in FIG. 19, specifically, one spring end 62a of the coil spring 62 is retained by the retaining projection 64 of the shift portion 61 and the other spring end 62b is retained by the drive force transmitted portion 45 of the first slider 40. As described above, the coil spring 62 is spanned between the retaining projection 64 and the drive force transmitted portion 45. In addition, the shift portion 61 is such that the drive force transmission portion 65 and the drive force transmitted portion 45 (the first slider 40) are biased by the biasing force of the coil spring 62 in such a direction as to approach each other. Thus, the drive force transmitted portion 45 undergoes the +X-directional force via the coil spring 62 in response to the +X-directional displacement of the shift portion 61 so that the first slider 40 is slidably displaced in the +X-direction.

As described above, the shift portion 61 and the first slider 40 are biased by the biasing device, which makes it possible for the first slider 40 to be slidably displaced in the ±X-direction in cooperation with the shift portion 61. Thus, the displacement in the X-axial direction is achieved with a high degree of accuracy.

In the image stabilizer unit 100 as described above, the drive force caused by the yaw-directional actuator 23 is transmitted to the first slider 40 via the biasing device and the drive force transmission portion 65 of the shift portion 61 which is not secured to the displacement body 70 and is formed as a member separate from the displacement body 70. This can reduce the influence of the turning of the displacement body 70 for correcting the turning error of the imaging element 15, on between the drive shaft AK3 of the yaw-directional actuator 23 and the friction joint portion 63 of the shift portion 61.

Comparison with Comparative Example

Figure 20:
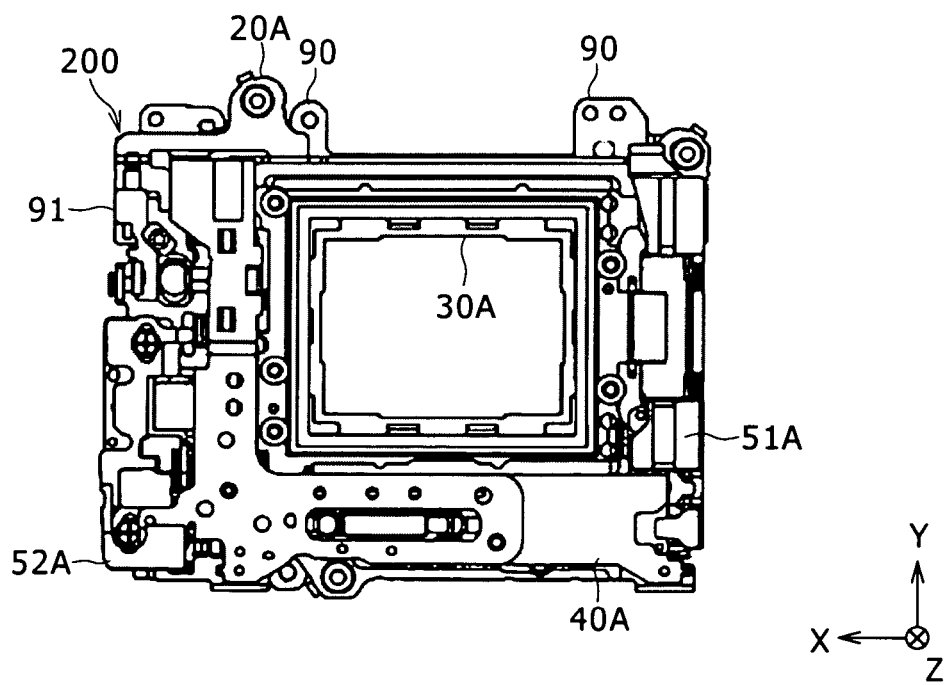
FIG. 20 is a front view of an image stabilizer unit according to a comparative example.
Figure 21:
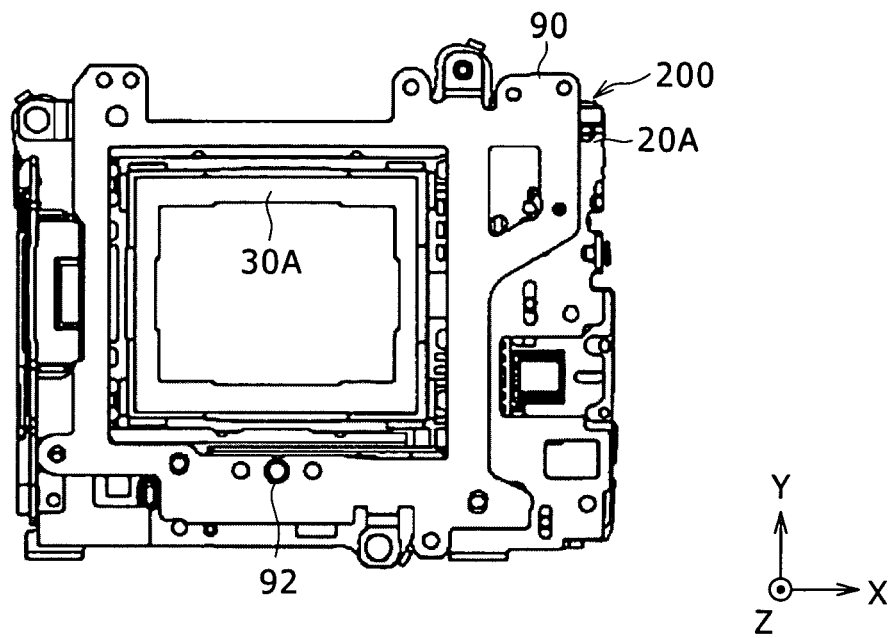
FIG. 21 is a rear view of the image stabilizer unit according to the comparative example.

Next, a comparison is made between the image stabilizer unit 100 of the present embodiment and an image stabilizer unit 200 of a comparative example as below. FIG. 20 is a front view of the image stabilizer unit 200 according to the comparative example. FIG. 21 is a rear view of the image stabilizer unit 200 according to the comparative example.

Figure 22:
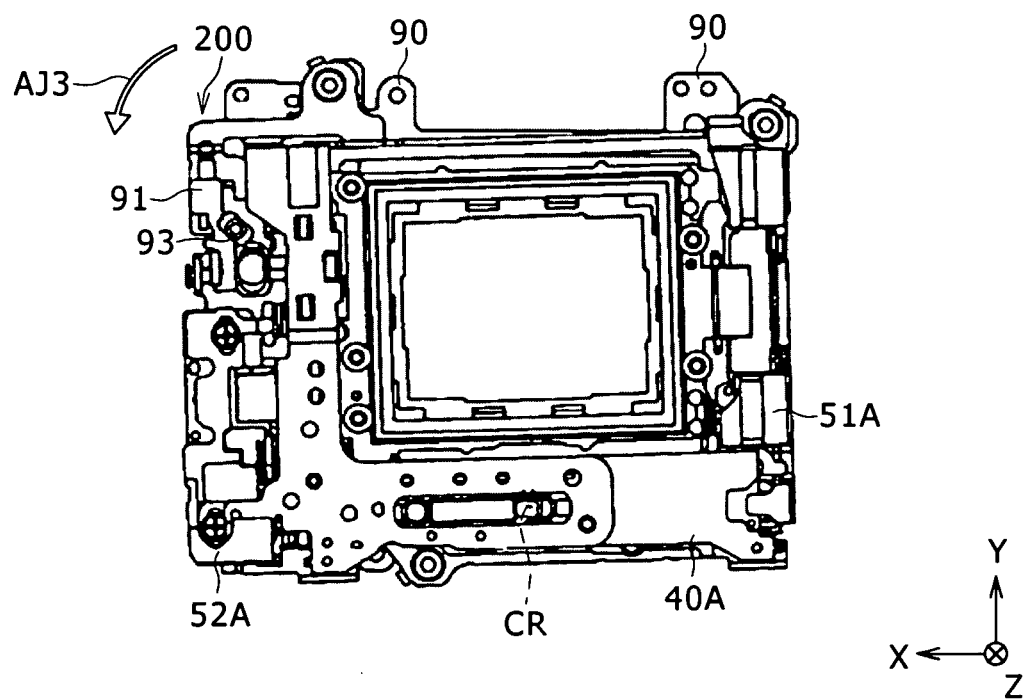
FIG. 22 illustrates a condition of correcting a turning error of the image stabilizer unit according to the comparative example.
Figure 23:
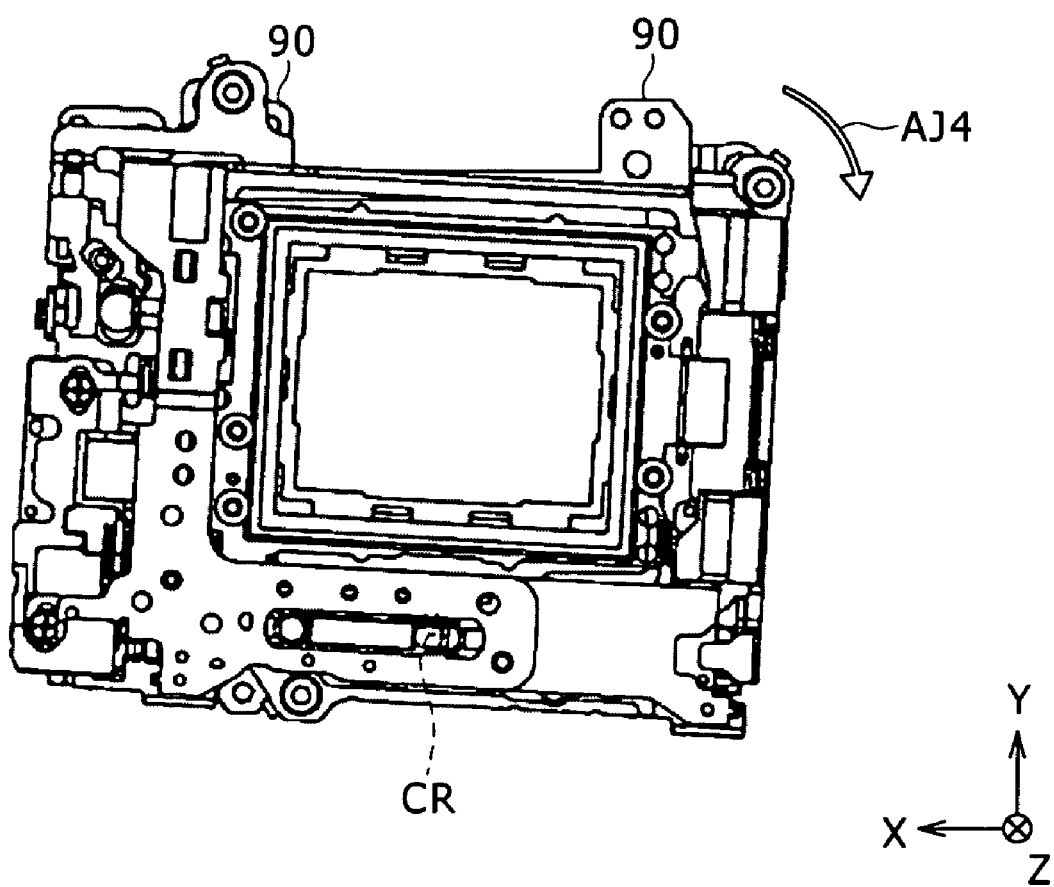
FIG. 23 illustrates a condition of correcting a turning error of the image stabilizer unit according to the comparative example.

FIGS. 22 and 23 illustrate conditions of correcting a turning error of the image stabilizer unit 200.

Referring to FIG. 20, the image stabilizer unit 200 according to the comparative example includes a base plate 20A, a first slider 40A, a second slider 30A, a first holding member 51A and a second holding member 52A. As illustrated in FIG. 21, the image stabilizer unit 200 is secured to the inside of the image pickup apparatus via a securing frame 90 attached to the side of the base plate 20.

The image stabilizer unit 200 is different from the image stabilizer unit 100 of the present embodiment in that the former has an adjusting member 91 (FIG. 20) adapted to turn the image stabilizer unit in the X-Y plane and a turning shaft 92 (FIG. 21) serving as a center during the turn. Therefore, in the following, the difference is mainly described and the explanation of the common portions is omitted.

In the image stabilizer unit 200, if there is a turning error in the assembled state, the turning error of the imaging element is corrected by turning the image stabilizer unit 200 with respect to the securing frame 90.

Specifically, in the image stabilizer unit 200, the operation of the adjusting member 91 can change the relative position between the image stabilizer unit 200 and the securing frame 90 at the existing point of the adjusting member 91. If the relative position is changed by the adjusting member 91, the image stabilizer unit 200 is turned and displaced with respect to the stationary frame 90 with the turning shaft 92 serving as a fulcrum. For example, FIG. 22 illustrates a state where the image stabilizer unit 200 is turned counterclockwise, as indicated with arrow AJ3, around a small circle CR indicating the existing position of the turning shaft 92. FIG. 23 illustrates a state where the image stabilizer unit 200 is turned clockwise, as indicated with arrow AJ4, around the small circle CR.

In the assembled state of the image stabilizer unit 200 configured as described above, if the turning error of the image element occurs, the operation of the adjusting member 91 as described above turns the overall image stabilizer unit 200 to correct the turning error.

However, in the correction method of the image stabilizer unit 200 according to the comparative example, the overall image stabilizer unit 200 is turned to correct the turning error. This increases the possibility that the image stabilizer unit 200 may interfere with other members in the image pickup apparatus. Therefore, the image pickup apparatus incorporating the image stabilizer unit 200 ensures a relatively wide space for avoiding the interference. This becomes a bottleneck in achieving the downsizing of the image pickup apparatus. In addition, in the turning error correction mechanism of the image stabilizer unit 200, a turn lock portion 93 for securing the image stabilizer unit 100 to the securing frame 90 and the turning shaft 92 have an assembly error. Hence, it is difficult to correct the turning error with accuracy.

In contrast to this, in the image stabilizer unit 100 according to the present embodiment, the turning adjustment for correcting the turning error is performed by turning the displacement body 70 in the image stabilizer unit 100. This can reduce the space for turning adjustment, thereby achieving the downsizing of the image pickup apparatus 1. In addition, the image stabilizer unit 100 does not have the adjusting member 91 and the turning shaft 92. That is to say, the turning lock portion 93 of the adjusting member 91 and the turning shaft 92 do not have an assembly error. Thus, it is possible to correct a turning error with accuracy.

As described above, the image stabilizer unit 100 according to the present embodiment includes the base plate 20; the displacement body 70 capable of being displaced in the Y-axial direction in the image element plane including the light-receiving surface of the imaging element 15 with respect to the base plate 20 in the imaging element 15 mounted state; and the guide mechanism AG1 and the guide mechanism AG2 for guiding the Y-axial movement of the displacement body 70. The guide mechanism AG2 includes the guide device mounted on the base plate 20; and the guided device mounted on the displacement body 70 and guided by the guide device. The guide device is configured to be able to change its position in the plane parallel to the imaging element plane. If the guided device is displaced in accordance with the positional change of the guide device, the displacement body 70 is turnably displaced with the guide mechanism AG2 serving as a fulcrum. In this way, the displacement body 70 provided with the imaging element 15 can be turnably displaced to correct the tilt of the imaging element 15.

<MODIFICATION>

The embodiment of the present invention has been described thus far. However, the invention is not limited to the details described above.

For example, the imaging element 15 is disposed on the displacement body (the second slider 30 in detail) in the embodiment. However, the invention is not limited to this.

Specifically, a lens-shift type image stabilizer unit may be configured in which an image stabilizer lens (correction lens) is disposed on the displacement body and the correction lens is shifted to correct an optical axis.

It should be understood by those skilled in the art that various modifications, combinations, sub-combinations and alternations may occur depending on design requirements and other factors insofar as they are within the scope of the appended claims or the equivalents thereof.

What is claimed is:

1. A drive device comprising:
   an imaging element creating an image signal relating to an object image;
   a securing body;
   a displacement body capable of displacement in a predetermined direction in a predetermined plane including a light-receiving surface of the imaging element with respect to the securing body with the imaging element mounted to the displacement body; and
   a first guide mechanism and a second guide mechanism adapted each to guide displacement of the displacement body in the predetermined direction;
   wherein the second guide mechanism includes
   guide means provided on the securing body, and
   guided means provided on the displacement body and guided by the guide means,
   the guide means being configured to be positionally changeable in a plane parallel to the predetermined plane, and
   the displacement body being turnably displaced with the first guide mechanism serving as a fulcrum when the guided means is displaced in response to the positional change of the guide means.

2. The drive device according to claim 1,
   wherein, if a straight line passing the first guide mechanism and the second guide mechanism is assumed, the guide means is positionally changed in a direction different from the predetermined direction and in a direction different from a direction along the straight line.

3. The drive device according to claim 2,
   wherein the first guide mechanism and the second guide mechanism are provided along the predetermined direction, and
   the guide means is positionally changeable in a direction vertical to the predetermined direction.

4. The drive device according to claim 3,
   wherein the guide means includes
   a first flat plate and a second flat plate opposed to each other, and
   pressing means pressing the second flat plate toward the first flat plate, and
   the guided means is a projecting portion projecting from the displacement body,
   the projecting portion being put between the first flat and the second flat plate, and
   the first flat plate being configured to be positionally changeable in a direction vertical to the predetermined direction.

5. The drive device according to claim 4, further comprising:
   a drive portion mounted to the securing body; and
   a driven body displaced by undergoing a drive force from the drive portion;
   wherein the driven body is not secured to the displacement body but is displaced in conjunction with the displacement body in response to the drive force.

6. An image pickup apparatus comprising:
   an imaging element creating an image signal relating to an object image; and
   a drive unit;
   wherein the drive unit includes
   a securing body,
   a displacement body capable of displacement in a predetermined direction in a predetermined plane including a light-receiving surface of the imaging element with respect to the securing body with the imaging element mounted to the displacement body, a first guide mechanism and a second guide mechanism adapted each to guide displacement of the displacement body in the predetermined direction, and the second guide mechanism including guide means provided on the securing body, and guided means provided on the displacement body and guided by the guide means, the guide means being configured to be positionally changeable in a plane parallel to the predetermined plane, and the displacement body being turnably displaced with the first guide mechanism serving as a fulcrum when the guided means is displaced in response to the positional change of the guide means.

* * * * *